United States Patent
Masel et al.

(10) Patent No.: US 9,370,773 B2
(45) Date of Patent: Jun. 21, 2016

(54) ION-CONDUCTING MEMBRANES

(71) Applicant: Dioxide Materials, Inc., Champaign, IL (US)

(72) Inventors: Richard L. Masel, Boca Raton, FL (US); Qingmei Chen, Savoy, IL (US); Zengcai Liu, Savoy, IL (US); Robert Kutz, Champaign, IL (US)

(73) Assignee: Dioxide Materials, Inc., Boca Raton, FL (US)

(*) Notice: Subject to any disclaimer, the term of this patent is extended or adjusted under 35 U.S.C. 154(b) by 0 days.

(21) Appl. No.: 14/704,935

(22) Filed: May 5, 2015

(65) Prior Publication Data

US 2016/0107154 A1    Apr. 21, 2016

Related U.S. Application Data

(63) Continuation-in-part of application No. PCT/US2015/014328, filed on Feb. 3, 2015, and a continuation-in-part of application No. PCT/US2015/026507, filed on Apr. 17, 2015.

(60) Provisional application No. 62/066,823, filed on Oct. 21, 2014.

(51) Int. Cl.
*H01M 8/10* (2016.01)
*B29C 41/50* (2006.01)
(Continued)

(52) U.S. Cl.
CPC ............... *B01J 41/14* (2013.01); *C25B 13/08* (2013.01); *H01M 8/1023* (2013.01); *H01M 8/1044* (2013.01); *H01M 2300/0082* (2013.01)

(58) Field of Classification Search
USPC .................................. 429/483, 479; 525/191
See application file for complete search history.

(56) References Cited

U.S. PATENT DOCUMENTS

| | | |
|---|---|---|
| 3,401,099 A | 9/1968 | McEvoy |
| 3,896,015 A | 7/1975 | McRae |

(Continued)

FOREIGN PATENT DOCUMENTS

| | | |
|---|---|---|
| KR | 101360269 | 11/2012 |
| WO | WO 2016/039999 | 3/2016 |

OTHER PUBLICATIONS

Li et al., "Novel anion exchange membranes based on polymerizable imidazolium salt for alkaline fuel cell applications", J. Mater. Chem. 21 (2011), pp. 11340-11346.*

(Continued)

*Primary Examiner* — Peter D Mulcahy
*Assistant Examiner* — Henry Hu
(74) *Attorney, Agent, or Firm* — Corridor Law Group, P.C.

(57) ABSTRACT

An ion conducting polymeric composition mixture comprises a copolymer of styrene and vinylbenzyl-$R_s$. $R_s$ is selected from the group consisting of imidazoliums and pyridiniums. The composition contains 10%-90% by weight of vinylbenzyl-$R_s$. The composition can further comprise a polyolefin comprising substituted polyolefins, a polymer comprising cyclic amine groups, a polymer comprising at least one of a phenylene group and a phenyl group, a polyamide, and/or the reaction product of a constituent having two carbon-carbon double bonds. The composition can be in the form of a membrane. In a preferred embodiment, the membrane is a Helper Membrane that increases the faradaic efficiency of an electrochemical cell into which the membrane is incorporated, and also allows product formation at lower voltages than in cells without the Helper Membrane.

17 Claims, 1 Drawing Sheet

(51) Int. Cl.
B01J 41/14 (2006.01)
C25B 13/08 (2006.01)

(56) References Cited

U.S. PATENT DOCUMENTS

| | | | |
|---|---|---|---|
| 4,113,922 | A | 9/1978 | D'Agostino et al. |
| 4,430,445 | A | 2/1984 | Miyake et al. |
| 4,456,521 | A | 6/1984 | Solomon |
| 7,704,369 | B2 | 4/2010 | Olah et al. |
| 8,138,380 | B2 | 3/2012 | Olah et al. |
| 8,313,634 | B2 | 11/2012 | Bocarsly et al. |
| 8,357,270 | B2 | 1/2013 | Gilliam et al. |
| 8,414,758 | B2 | 4/2013 | Deguchi et al. |
| 8,449,652 | B2 | 5/2013 | Radosz et al. |
| 8,500,987 | B2 | 8/2013 | Teamey et al. |
| 8,524,066 | B2 | 9/2013 | Sivasankar et al. |
| 8,552,130 | B2 | 10/2013 | Lewandowski et al. |
| 8,562,811 | B2 | 10/2013 | Sivasankar et al. |
| 8,568,581 | B2 | 10/2013 | Sivasankar et al. |
| 8,592,633 | B2 | 11/2013 | Cole et al. |
| 8,658,016 | B2 | 2/2014 | Lakkaraju et al. |
| 8,663,447 | B2 | 3/2014 | Bocarsly et al. |
| 8,696,883 | B2 | 4/2014 | Yotsuhashi et al. |
| 8,721,866 | B2 | 5/2014 | Sivasankar et al. |
| 2009/0266230 | A1 | 10/2009 | Radosz et al. |
| 2011/0114502 | A1 | 5/2011 | Cole et al. |
| 2012/0171583 | A1 | 7/2012 | Bocarsly et al. |
| 2012/0186446 | A1* | 7/2012 | Bara et al. ............... 95/44 |
| 2012/0247969 | A1 | 10/2012 | Bocarsly et al. |
| 2013/0105304 | A1 | 5/2013 | Kaczur et al. |
| 2013/0146448 | A1 | 6/2013 | Wang et al. |
| 2013/0175181 | A1 | 7/2013 | Kaczur |
| 2013/0180865 | A1 | 7/2013 | Cole et al. |
| 2013/0199937 | A1 | 8/2013 | Cole et al. |

OTHER PUBLICATIONS

Lin et al., "Alkaline Stable C2-Substituted Imidazolium-Based Anion-Exchange Membranes", Chem. Mater. 25 (2013), pp. 1858-1867.*
Li et al., "Novel anion exchange membranes based on polymerizable imidazolium salt for alkaline fuel cell applications", J. Mater. Chem. 21 (2011), pp. 11340-11346.*
Chen et al., "Composite Blend Polymer Membranes with Increased Proton Selectivity and Lifetime for Vanadium Redox Flow Batteries", J. of Power Sources 231 (2013), pp. 301-306.*
Zhang et al., "Imidazolium functionalized polysulfone anion exchange membrane for fuel cell application", J. Mater. Chem. 21 (2011), pp. 12744-12752.*
Dewulf et al., "The electrochemical reduction of CO2 to CH4 and C2H4 at cu/nafion electrodes (solid polymer electrolyte structures)", Catalysis Letters 1 (1988), pp. 73-80.
Kaneco et al., "Electrochemical conversion of carbon dioxide to methane in aqueous NaHCO3 solution at less than 273 K" Electrochimica Acta 48 (2002), pp. 51-55.
Tang et al., "Poly(ionic liquid)s as New Materials for CO2 Absorption", Journal of Polymer Science Part A: Polymer Chemistry 43 (2005), pp. 5477-5489.
Delacourt et al., "Design of an Electrochemical Cell Making Syngas (CO + H2) from CO2 and H2O Reduction at Room Temperature", J. of the Electrochemical Society 155 (2008), pp. B42-B49.
Narayanan et al., "Electrochemical Conversion of Carbon Dioxide to Formate in Alkaline Polymer Electrolyte Membrane Cells", J. of the Electrochemical Society 158 (2011), pp. A167-A173.
Rosen et al., "Ionic Liquid-Mediated Selective Conversion of CO2 to CO at Low Overpotentials", Science 334 (2011) pp. 643-644.
Zhang et al., "Imidazolium functionalized polysulfone anion exchange membrane for fuel cell application", J. Mater. Chem. 21 (2011), pp. 12744-12752.
Aeshala et al., "Effect of solid polymer electrolyte on electrochemical reduction of CO2", Separation and Purification Technology 94 (2012), pp. 131-137.

Oh, "Synthesis and Applications of Imidazolium-Based Ionic Liquids and Their Polymer Derivatives", Dissertation at the Missouri University of Science and Technology (2012).
Rosen et al., "In Situ Spectroscopic Examination of a Low Overpotential Pathway for Carbon Dioxide Conversion to Carbon Monoxide", J. of Physical Chemistry 116 (2012), pp. 15307-15312.
Aeshala et al., "Effect of cationic and anionic solid polymer electrolyte on direct electrochemical reduction of gaseous CO2 to fuel", Journal of CO2 Utilization 3-4 (2013), pp. 49-55.
Genovese et al., "A gas-phase electrochemical reactor for carbon dioxide reduction back to liquid fuels", AIDIC Conference Series 11 (2013), pp. 151-160.
Hickner et al., "Anion Exchange Membranes: Current Status and Moving Forward", J. of Polymer Sci. 51 (2013), pp. 1727-1735.
Prakash et al., "Electrochemical reduction of CO2 over Sn-Nafion coated electrode for a fuel-cell-like device", J. of Power Sources 223 (2013), pp. 68-73.
Rosen et al., "Low temperature electrocatalytic reduction of carbon dioxide utilizing room temperature ionic liquids", Dissertation at the University of Illinois (2013).
Rosen et al., "Water Enhancement of CO2 Conversion on Silver in 1-Ethyl-3-Methylimidazolium Tetrafluoroborate", J. of the Electrochemical Society 160 (2013), pp. H138-H141.
Shironita et al., "Feasibility investigation of methanol generation by CO2 reduction using Pt/C-based membrane electrode assembly for a reversible fuel cell", J. of Power Sources 228 (2013), pp. 68-74.
Shironita et al., "Methanol generation by CO2 reduction at a PteRu/C electrocatalyst using a membrane electrode assembly", J. of Power Sources 240 (2013), pp. 404-410.
Thorson et al., "Effect of Cations on the Electrochemical Conversion of CO2 to CO", J. of the Electrochemical Society 160 (2013), pp. F69-F74.
Wu et al., "Electrochemical Reduction of Carbon Dioxide", J. of The Electrochemical Society 160 (2013), pp. F953-F957.
Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.
Ma et al., "Efficient Electrochemical Flow System with Improved Anode for the Conversion of CO2 to CO", J. of the Electrochemical Society 161 (2014), pp. F1124-F1131.
Said et al., "Functionalized Polysulfones as an Alternative Material to Improve Proton Conductivity at Low Relative Humidity Fuel Cell Applications", Chemistry and Materials Research 6 (2014), pp. 19-29.
Shi et al., "A novel electrolysis cell for CO2 reduction to CO in ionic liquid/organic solvent electrolyte", Journal of Power Sources 259 (2014) pp. 50-53.
Varcoe et al., "Anion-exchange membranes in electrochemical energy systems", Energy Environ. Sci. 7 (2014), pp. 3135-3191.
Kim et al., "Influence of dilute feed and pH on electrochemical reduction of CO2 to CO on Ag in a continuous flow electrolyzer", Electrochimica Acta 166 (2015), pp. 271-276.
Lee et al., "Humidity-sensitive properties of new polyelectrolytes based on the copolymers containing phosphonium salt and phosphine function", J. Applied Polymer Science 89 (2003), pp. 1062-1070.
Wang et al., "Water-Retention Effect of Composite Membranes with Different Types of Nanometer Silicon Dioxide" Electrochemical and Solid State Letters 11 (2008), p. B201.
International Search Report and Written Opinion issued on Jul. 6, 2015 in connection with International Application PCT/US2015/014328.
Luo et al., "Quaternized Poly(methyl methacrylate-co-butyl acrylate-co-vinylbenzyl chloride) Membrane for Alkaline =Fuel Cells", J. of Power Sources 195 (2010), pp. 3765-3771.
Sarode et al., "Designing Alkaline Exchange Membranes from Scratch", ECS Transactions 41 (2011), pp. 1761-1774.
Chen et al., "A Concept of Supported Amino Acid Ionic Liquids and Their Application in Metal Scavenging and Heterogeneous Catalysis", J. Am. Chem. Soc. 129 (2007), pp. 13879-13886.
Weber et al., "Thermal and Ion Transport Properties of Hydrophilic and Hydrophobic Polymerized Styrenic Imidazolium Ionic Liquids", J. of Polymer Sci.: Part B: Polymer Phy. 49 (2011) pp. 1287-1296.

(56) References Cited

OTHER PUBLICATIONS

Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.

Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.

Parrondo et al., "Degradation of Anion Exchange Membranes Used for Hydrogen Production by Ultrapure Water Electrolysis", Royal Soc. of Chem. Adv. 4 (2014), pp. 9875-9879.

Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.

International Search Report and Written Opinion issued on Jul. 20, 2015 in connection with International Application PCT/US2015/026507.

* cited by examiner

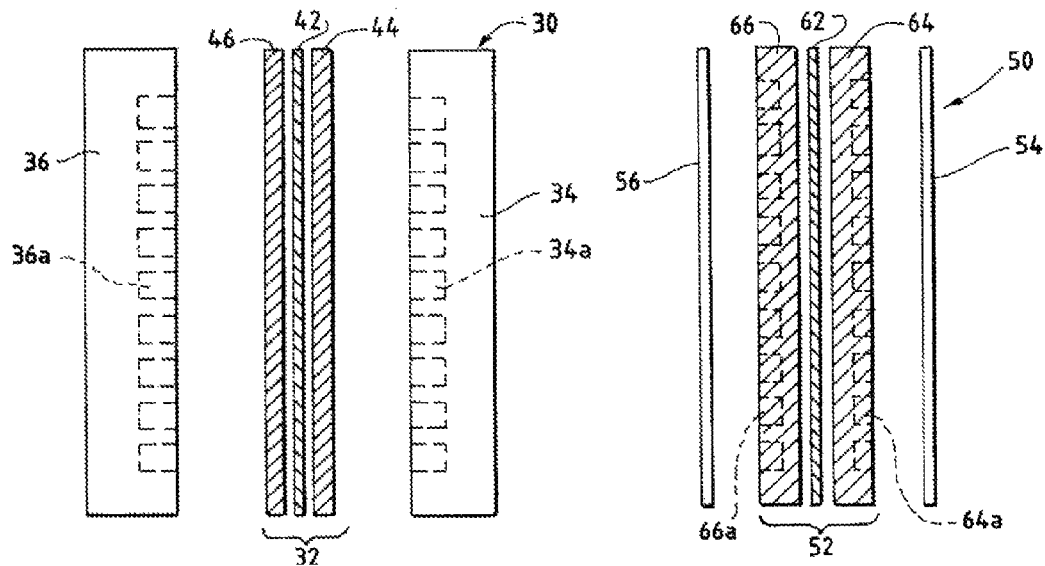
FIG. 1             FIG. 2
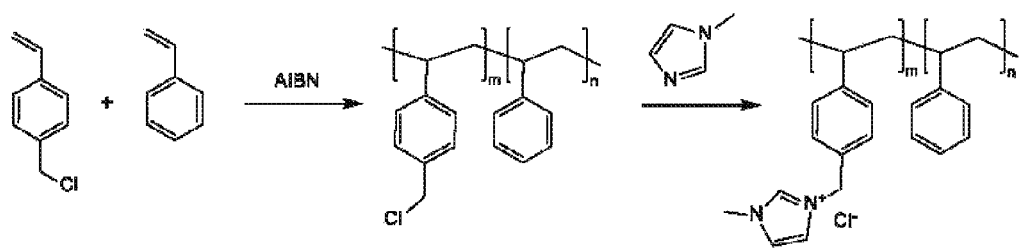
FIG. 3

ION-CONDUCTING MEMBRANES

CROSS-REFERENCE TO RELATED APPLICATIONS

The present application is a continuation-in-part of International Application No. PCT/US2015/14328, filed Feb. 3, 2015, entitled "Electrolyzer and Membranes". The '328 international application claims priority benefits, in turn, from U.S. provisional patent application Ser. No. 62/066,823 filed Oct. 21, 2014.

The present application is also a continuation-in-part of International Application No. PCT/US2015/26507, filed Apr. 17, 2015, entitled "Electrolyzer and Membranes". The '507 international application also claims priority benefits, in turn, from U.S. provisional patent application Ser. No. 62/066,823 filed Oct. 21, 2014.

The present application is also related to and claims priority benefits from U.S. provisional patent application Ser. No. 62/066,823 filed Oct. 21, 2014.

The '823 provisional application and the '328 and '507 international applications are each hereby incorporated by reference herein in their entirety This application is also related to U.S. patent application Ser. No. 14/035,935, filed Sep. 24, 2013, entitled "Devices and Processes for Carbon Dioxide Conversion into Useful Fuels and Chemicals"; U.S. patent application Ser. No. 12/830,338, filed Jul. 4, 2010, entitled "Novel Catalyst Mixtures"; International Application No. PCT/2011/030098 filed Mar. 25, 2011, entitled "Novel Catalyst Mixtures"; U.S. patent application Ser. No. 13/174,365, filed Jun. 30, 2011, entitled "Novel Catalyst Mixtures"; International Patent Application No. PCT/US2011/042809, filed Jul. 1, 2011, entitled "Novel Catalyst Mixtures"; U.S. patent application Ser. No. 13/530,058, filed Jun. 21, 2012, entitled "Sensors for Carbon Dioxide and Other End Uses"; International Patent Application No. PCT/US2012/043651, filed Jun. 22, 2012, entitled "Low Cost Carbon Dioxide Sensors"; and U.S. patent application Ser. No. 13/445,887, filed Apr. 12, 2012, entitled "Electrocatalysts for Carbon Dioxide Conversion".

STATEMENT OF GOVERNMENT INTEREST

This invention was made, at least in part, with U.S. government support under ARPA-E Contract No. DE-AR-0000345 and the Department of Energy under Contract No. DE-SC0004453. The government has certain rights in the invention.

FIELD OF THE INVENTION

The field of the invention is electrochemistry. The devices, systems and compositions described involve the electrochemical conversion of carbon dioxide into useful products, the electrolysis of water, electric power generation using fuel cells and electrochemical water purification.

BACKGROUND OF THE INVENTION

There is a desire to decrease carbon dioxide ($CO_2$) emissions from industrial facilities and power plants as a way of reducing global warming and protecting the environment. One solution, known as carbon sequestration, involves the capture and storage of $CO_2$. Often the $CO_2$ is simply buried. It would be beneficial if instead of simply burying or storing the $CO_2$, it could be converted into another product and put to a beneficial use.

Over the years, a number of electrochemical processes have been suggested for the conversion of $CO_2$ into useful products. Some of these processes and their related catalysts are discussed in U.S. Pat. Nos. 3,959,094; 4,240,882; 4,349,464; 4,523,981; 4,545,872; 4,595,465; 4,608,132; 4,608,133; 4,609,440; 4,609,441; 4,609,451; 4,620,906; 4,668,349; 4,673,473; 4,711,708; 4,756,807; 4,818,353; 5,064,733; 5,284,563; 5,382,332; 5,457,079; 5,709,789; 5,928,806; 5,952,540; 6,024,855; 6,660,680; 6,664,207; 6,987,134; 7,157,404; 7,378,561; 7,479,570; U.S. Patent App. Pub. No. 2008/0223727; Hori, Y., "Electrochemical CO2 reduction on metal electrodes", *Modern Aspects of Electrochemistry* 42 (2008), pages 89-189; Gattrell, M. et al. "A review of the aqueous electrochemical reduction of CO2 to hydrocarbons at copper", *Journal of Electroanalytical Chemistry* 594 (2006), pages 1-19; and DuBois, D., *Encyclopedia of Electrochemistry*, 7a, Springer (2006), pages 202-225. Processes utilizing electrochemical cells for chemical conversions have been known for years. Generally an electrochemical cell contains an anode, a cathode and an electrolyte. Catalysts can be placed on the anode, the cathode, and/or in the electrolyte to promote the desired chemical reactions. During operation, reactants or a solution containing reactants are fed into the cell. Voltage is then applied between the anode and the cathode, to promote the desired electrochemical reaction.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds.

Several different cell designs have been used for $CO_2$ conversion. Most of the early work used liquid electrolytes between the anode and cathode while later scientific papers discussed using solid electrolytes.

U.S. Pat. Nos. 4,523,981; 4,545,872; and 4,620,906 disclose the use of a solid polymer electrolyte membrane, typically a cation exchange membrane, wherein the anode and cathode are separated by the cation exchange membrane. More recent examples of this technique include U.S. Pat. Nos. 7,704,369; 8,277,631; 8,313,634; 8,313,800; 8,357,270; 8,414,758; 8,500,987; 8,524,066; 8,562,811; 8,568,581; 8,592,633; 8,658,016; 8,663,447; 8,721,866; and 8,696,883. In these patents, a liquid electrolyte is used in contact with a cathode.

Prakash, G., et al. "Electrochemical reduction of $CO_2$ over Sn-Nafion coated electrode for a fuel-cell-like device", *Journal of Power Sources* 223 (2013), pages 68-73 ("PRAKASH"), discusses the advantages of using a liquid free cathode in a cation exchange membrane style $CO_2$ electrolyzer although it fails to teach a liquid free cathode. Instead, a liquid solution is fed into the cathode in the experiments discussed in PRAKASH.

In a liquid free cathode electrolyzer no bulk liquids are in direct contact with the cathode during electrolysis, however there can be a thin liquid film on or in the cathode. In addition the occasional wash or rehydration of the cathode with liquids may occur. Advantages of using a liquid free cathode included better $CO_2$ mass transfer and reduced parasitic resistance.

Dewolf, D., et al. "The electrochemical reduction of $CO_2$ to $CH_4$ and $C_2H_4$ at Cu/Nafion electrodes (solid polymer electrolyte structures)" *Catalysis Letters* 1 (1988), pages 73-80 ("DEWOLF"), discloses the use of a liquid free cathode in a cation exchange membrane electrolyzer: an electrolyzer with a cation-conducting polymer electrolyte membrane separating the anode from the cathode. DEWOLF reports an observed maximum faradaic efficiency (the fraction of the electrons applied to the cell that participate in reactions producing carbon containing products) of 19% for $CO_2$ conversion into useful products and a small steady state current of 1 $mA/cm^2$.

When the term mA/cm2 is used in this disclosure, the $cm^2$ is measured as the area of the cathode gas diffusion layer that is covered by catalyst particles.

Various attempts have been made to develop a dry cell to be used in a $CO_2$ conversion system, as indicated in Table 1 below. However, a system in which the faradaic efficiency in a constant voltage experiment is greater than 32% has not been achieved. Furthermore, the reported rates of $CO_2$ conversion current (calculated as the product of the faradaic efficiency for $CO_2$ conversion and the current in the cell after 30 minutes of operation) have been less than 5 $mA/cm^2$, which is too small for practical uses.

There are a few reports that claim higher conversion efficiencies. In particular, Shironita, S., et al., "Feasibility investigation of methanol generation by CO2 reduction using Pt/C-based membrane electrode assembly for a reversible fuel cell", *J. Power Sources* 228 (2013), pages 68-74 ("SHIRONITA I"), and Shironita, S., et al., "Methanol generation by CO2 reduction at a Pt—Ru/C electrocatalyst using a membrane electrode assembly", *J. Power Sources* 240 (2013), pages 404-410 ("SHIRONITA II"), reported "coulombic efficiencies" up to 70%. However columbic efficiency is different from faradaic efficiency. A system can have a high coulombic efficiency for the production of species adsorbed on the electrocatalyst, but may only observe a small faradaic efficiency (0.03% in SHIRONITA I and SHIRONITA II) for products that leave the catalyst layer. This phenomena is adequately explained in Rosen, B. A., et al., "In Situ Spectroscopic Examination of a Low Overpotential Pathway for Carbon Dioxide Conversion to Carbon Monoxide", *J. Phys. Chem. C,* 116 (2012), pages 15307-15312, which found that when $CO_2$ is reduced to adsorbed CO during $CO_2$ conversion by cyclic voltammetry, most of the CO does not leave the electrolyzer.

Recently, U.S. Patent Application Publication No. US2012/0171583 (the '583 publication) disclosed a cation exchange membrane design that could be run with a liquid free cathode. The application states that a "system may provide selectivity of methanol as part of the organic product mixture, with a 30% to 95% faradaic yield for carbon dioxide to methanol, with the remainder evolving hydrogen." However, the application does not provide data demonstrating a 30% to 95% faradaic yield. Furthermore, in trying to repeat the experiment, a steady state faradaic efficiency near zero during room temperature electrolysis was observed. These results are further laid out in Comparison Example 1 below.

In conclusion, faradaic efficiencies of less than 30% are not practical. What is needed is a process that has a faradaic efficiency of at least 50%, preferably over 80%. Furthermore, a device with a low $CO_2$ conversion current is impractical. What is needed is a device with a $CO_2$ conversion current of at least 25 $mA/cm^2$.

SUMMARY OF THE INVENTION

An ion conducting polymeric composition mixture comprises styrene and vinylbenzyl-$R_s$. $R_s$ is selected from the group consisting of imidazoliums and pyridiniums. The polymeric composition contains 35%-90% by weight of vinylbenzyl-$R_s$, preferably 40%-90% by weight of vinylbenzyl-R, and more preferably 50%-80% by weight of vinylbenzyl-R.

In a preferred embodiment of the polymeric composition, R is an imidazolium. The imidazolium is preferably an alkylimidazolium, more preferably methylimidazolium.

In a preferred embodiment, the polymer will have a molecular weight between 1000 and 10,000,000 atomic units (A.U.) preferably between 10,000 and 1,000,000 A.U., most preferably between 25,000 and 250,000 A.U.

In a preferred embodiment, the polymeric composition further comprises at least one constituent selected from the group consisting of:

(a) a linear or substituted polyolefin;

(b) a polymer comprising cyclic amine groups;

(c) a polymer comprising at least one of a phenylene group and a phenyl group;

(d) a polyamide; and (e) the reaction product of a constituent having two carbon-carbon double bonds.

In a preferred embodiment, the polyolefin is polyethylene, the polymer comprising cyclic amine groups is polybenzimidazole, the polymer comprising at least one of a phenylene group and a phenyl groups is polyphenylene oxide, and the constituent having two carbon-carbon double bonds is divinyl benzene or butadiene. The preferred polyamide constituent is polybenzimidazole.

In a preferred embodiment, the polymeric composition is in the form of a membrane. The membrane has a preferred thickness of 10-300 micrometers.

A membrane can be classified as a Helper Membrane if it meets the following test:

(1) A cathode is prepared as follows:

(a) A silver ink is made by mixing 30 mg of silver nanoparticles (20-40 nm, stock #45509, Alfa Aesar, Ward Hill, Mass.) with 0.1 ml deionized water (18.2 Mohm, EMD Millipore, Billerica, Mass.) and 0.2 ml isopropanol (stock #3032-16, Macron Fine Chemicals, Avantor Performance Materials, Center Valley, Pa.). The mixture is then sonicated for 1 minute.

(b) The silver nanoparticle ink is hand painted onto a gas diffusion layer (Sigracet 35 BC GDL, Ion Power Inc., New Castle, Del.) covering an area of 2.5 cm×2.5 cm.

(2) An anode is prepared as follows:

(a) $RuO_2$ ink is made by mixing 15 mg of $RuO_2$ (stock #11804, Alfa Aesar) with 0.2 ml deionized water (18.2 Mohm Millipore), 0.2 ml isopropanol (stock #3032-16, Macron) and 0.1 ml of 5% Nafion solution (1100EW, DuPont, Wilmington, Del.).

(b) The $RuO_2$ ink is hand-painted onto a gas diffusion layer (Sigracet 35 BC GDL, Ion Power) covering an area of 2.5 cm×2.5 cm.

(3) A 50-300 micrometer thick membrane of a "test" material is made by conventional means such as casting or extrusion.

(4) The membrane is sandwiched between the anode and the cathode with the silver and ruthenium oxide catalysts facing the membrane.

(5) The membrane electrode assembly is mounted in Fuel Cell Technologies (Albuquerque, N. Mex.) 5 $cm^2$ fuel cell hardware assembly with serpentine flow fields.

(6) $CO_2$ humidified at 50° C. is fed into the cathode at a rate of 5 sccm with the cell at room temperature and pressure, the anode side is left open to the atmosphere at room temperature and pressure, 3.0 V is applied to the cell, and the cathode output composition is analyzed after the cell has been running for 30 minutes at room temperature.

(7) Selectivity is calculated as follows:

$$\text{Selectivity} = \frac{(CO \text{ production rate})}{(CO \text{ production rate} + H_2 \text{ production rate})}$$

where the CO and H2 production rates are measured in standard cubic centimeters per minute (sccm) leaving the electrolyzer.

If Selectivity is greater than 50%, and the CO2 conversion current at 3.0 V is 20 mA/cm2 or more, the membrane containing the material is a Helper Membrane, for which:

(CO$_2$ conversion current)=(Total cell current)*(Selectivity)

BRIEF DESCRIPTION OF THE DRAWINGS

FIG. 1 is an exploded side view of a fuel cell hardware assembly including a membrane electrode assembly interposed between two fluid flow field plates having reactant flow channels formed in the major surfaces of the plates facing the electrodes.

FIG. 2 is an exploded side view of a fuel cell hardware assembly including a membrane electrode assembly having integral reactant flow channels interposed between two separator layers.

FIG. 3 shows the synthetic route for imidazolium based polymers. Imidazolium refers to positively charged imidazole ligands.

DETAILED DESCRIPTION OF ILLUSTRATIVE EMBODIMENTS

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those skilled in the art. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as the skilled artisan would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

DEFINITIONS

The term "electrochemical conversion of $CO_2$" as used here refers to any electrochemical process where carbon dioxide, carbonate, or bicarbonate is converted into another chemical substance in any step of the process.

The term polymer electrolyte membrane refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation NAFION from E. I. du Pont de Nemours and Company (DuPont) of Wilmington, Del.

The term "anion exchange membrane electrolyzer" as used here refers to an electrolyzer with an anion-conducting polymer electrolyte membrane separating the anode from the cathode.

The term "liquid free cathode" refers to an electrolyzer where there are no bulk liquids in direct contact with the cathode during electrolysis. There can be a thin liquid film on or in the cathode, however, and occasional wash, or rehydration of the cathode with liquids could occur.

The term "faradaic efficiency" as used here refers to the fraction of the electrons applied to the cell that participate in reactions producing carbon containing products.

The term "EMIM" as used here refers to 1-ethyl-3-methylimidazolium cations.

The term "Hydrogen Evolution Reaction" also called "HER" as used here refers to the electrochemical reaction $2H^+ + 2e^- \rightarrow H_2$.

The term "MEA" as used here refers to a membrane electrode assembly.

The Term "CV" refers to cyclic voltammetry.

The term "Millipore water" is water that is produced by a Millipore filtration system with a resistivity of at least 18.2 megaohm-cm.

The term "SPEEK" as used here refers to sulfonated poly (ether ether ketone).

The term "PVA" as used here refers to polyvinyl alcohol.

The term "PEI" as used here refers to polyethylenimine.

The term "GC" as used here refers to a gas chromatograph.

The term "imidazolium" as used here refers to a positively charged ligand containing an imidazole group. This includes a bare imidazole or a substituted imidazole. Ligands of the form:

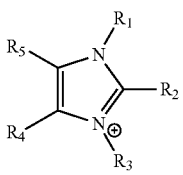

where $R_1$-$R_5$ are each independently selected from hydrogen, halides linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "pyridinium" as used here refers to a positively charged ligand containing a pyridine group. This includes a bare pyridine or a substituted pyridine. Ligands of the form

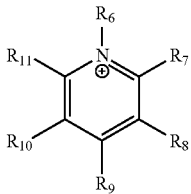

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used here refers to a positively charged ligand containing phosphorous. This includes substituted phosphorous. Ligands of the form:

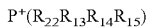

$$P^+(R_{22}R_{13}R_{14}R_{15})$$

where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

Specific Description

FIG. 1 illustrates a fuel cell hardware assembly 30, which includes a membrane electrode assembly 32 interposed between rigid flow field plates 34 and 36, typically formed of graphite or a graphite composite material. Membrane electrode assembly 32 consists of a polymer electrolyte (ion exchange) membrane 42 interposed between two electrodes, namely, anode 44 and cathode 46. Anode 44 and cathode 46 are typically formed of porous electrically conductive sheet material, preferably carbon fiber paper, and have planar major surfaces. Electrodes 44 and 46 have a thin layer of catalyst material disposed on their major surfaces at the interface with membrane 42 to render them electrochemically active.

As shown in FIG. 1, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the anode reactant (fuel) stream and cathode reactant (oxidant) stream, respectively.

Turning to FIG. 2, a fuel cell hardware assembly 50 employs a membrane electrode assembly 52 having integral reactant fluid flow channels. Fuel cell hardware assembly 50 includes membrane electrode assembly 52 interposed between lightweight separator layers 54 and 56, which are substantially impermeable to the flow of reactant fluid therethrough. Membrane electrode assembly 52 consists of a polymer electrolyte (ion exchange) membrane 62 interposed between two electrodes, namely, anode 64 and cathode 66. Anode 64 and cathode 66 are formed of porous electrically conductive sheet material, preferably carbon fiber paper. Electrodes 64 and 66 have a thin layer of catalyst material disposed on their major surfaces at the interface with membrane 62 to render them electrochemically active.

As shown in FIG. 2, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the fuel and oxidant streams, respectively.

During operation, reactants or a solution containing reactants is fed into the cell. Then a voltage is applied between the anode and the cathode, to promote an electrochemical reaction.

Alternately, when the device is used as a fuel cell, reactants or a solution containing reactants is fed into the fuel cell hardware assembly, and a voltage spontaneously develops between the anode and cathode. This voltage can produce a current through an external circuit connecting the anode and cathode.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds.

The present electrochemical device for electrochemical conversion of $CO_2$, water, carbonate, and/or bicarbonate into another chemical substance has an anode, a cathode, and a Helper Membrane.

In some embodiments there are no, or substantially no, bulk liquids in contact with the cathode during cell operation, and the faradaic efficiency for $CO_2$ conversion is at least 33%, more preferably at least 50%, or most preferably at least 80%.

The device can also include at least one Catalytically Active Element. "Catalytically Active Element" as used here refers to a chemical element that can serve as a catalyst for the electrochemical conversion of $CO_2$ or another species of interest in a desired reaction. In particular, the device can include one or more of the following Catalytically Active Elements: V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, and Nd. Research has established that Pt, Pd, Au, Ag, Cu, Ni, Fe, Sn, Bi, Co, In, Ru and Rh work well with Au, Ag, Cu, Sn, Sb, Bi, and In working especially well. The products of the reaction can include, among other things: CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, $(COO)_2$, $H_2C\!=\!CHCOOH$, $CF_3COOH$, other organic acids, carbonates, di-phenyl carbonate, and polycarbonates.

Without further elaboration, it is believed that persons familiar with the technology involved here using the preceding description can utilize the invention to the fullest extent. The following examples are illustrative only, and are not meant to be an exhaustive list of all possible embodiments, applications or modifications of the invention.

Specific Example 1

Specific Example 1 illustrates a procedure to create an electrolyzer with a Helper Membrane. The embodiment of Specific Example 1 demonstrates improved performance over earlier electrochemical cells used for $CO_2$ conversion.

Measurements were conducted in an electrolysis cell with an anode, cathode, and anion-conducting polymer electrolyte membrane held in Fuel Cell Technologies 5 cm$^2$ fuel cell hardware assembly with serpentine flow fields.

The cathode in Specific Example 1 was prepared as follows. Silver ink was made by mixing 30 mg of silver nanoparticles (20-40 nm, 45509, Alfa Aesar, Ward Hill, Mass.) with 0.1 ml deionized water (18.2 Mohm, EMD Millipore, Billerica, Mass.) and 0.2 ml isopropanol (3032-16, Macron Fine Chemicals, Avantor Performance Materials, Center Valley, Pa.). The mixture was then sonicated for 1 minute. The silver ink was then hand-painted onto a gas diffusion layer (Sigracet 35 BC GDL, Ion Power Inc., New Castle, Del.) covering an area of 2.5 cm×2.5 cm.

The anode in Specific Example 1 was prepared as follows. $RuO_2$ ink was made by mixing 15 mg of $RuO_2$ (11804, Alfa Aesar) with 0.2 ml deionized water (18.2 Mohm Millipore), 0.2 ml isopropanol (3032-16, Macron) and 0.1 ml of 5% Nafion solution (1100EW, DuPont, Wilmington, Del.). The $RuO_2$ ink was then hand-painted onto a gas diffusion layer (Sigracet 35 BC GDL, ion Power, Inc.) covering an area of 2.5 cm×2.5 cm.

The PSMMIM membrane was prepared following the synthetic route in FIG. 3. "PSMMIM" refers to a co-polymer of polystyrene and poly 1-(p-vinylbenzyl)-3-methyl-imidazolium:

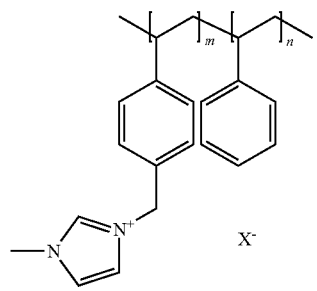

where $X^-$ is an anion and m>0 and n>0.

The first inhibitor free styrene was prepared by washing styrene (Sigma Aldrich, Saint Louis, Mo.) with two equal volumes of 7.5% aqueous sodium hydroxide. The inhibitor free styrene was then washed with four equal volumes of water to make sure it was neutralized, and was then dried over anhydrous magnesium sulfate. Inhibitor TBC in 4-vinylbenzyl chloride (4-VBC) was removed by extraction with 0.5% potassium hydroxide solution until a colorless extract was obtained. This extract was washed with water until neutral and then was dried over anhydrous magnesium sulfate.

Poly(4-vinylbenzyl chloride-co-styrene) was then synthesized by heating a solution of inhibitor free styrene (Sigma-Aldrich) (10.0581 g, 96.57 mmol) and 4-vinylbenzyl chloride (Sigma-Aldrich) (6.2323 g, 40.84 mmol) in chlorobenzene (Sigma-Aldrich) (15 ml) at 60-65° C. in an oil bath for 12-18 hours under argon gas with AIBN (α,α'-Azoisobutyronitrile, Sigma-Aldrich) (0.1613 g, 0.99 wt % based on the total monomers weight) as initiator. The copolymer was precipitated in $CH_3OH$/THF (methanol/tetrahydrofuran) and dried under vacuum.

Polystyrene methyl-methyimidazolium chloride (PSMMIM) was synthesized by adding 1-methylimidazole (Sigma-Aldrich) (2.8650 g, 0.0349 mol), which is an alkylimidazolium, to the solution of the poly(4-VBC-co-St) (5.0034 g) in anhydrous N,N-Dimethylformamide (DMF) (Sigma-Aldrich) (30 mL). The mixture was then stirred at room temperature for 0.5-1 hour, and then heated at 110-120° C. for 50.3 hours to form a PSMMIM solution.

The molecular weight of the sample was measured. Different runs gave molecular weights between 47,000 and 51,000 atomic units (A.U.). In one case, a polymer with a molecular weight of 230,000 A.U. was produced. It is anticipated that membranes with a molecular weight below 1000 A.U. will be too soft to form useful membranes. Membranes with molecular weights above 10,000,000 will be too difficult to cast via solution membranes. Preferred polymers have a molecular weight between 10,000 and 1,000,000 A.U., most preferred between 40,000 and 250,000 A.U.

"4-VBC-co-St" or "poly(4-vinylbenzyl chloride-co-styrene)" as used here refers to a co-polymer of styrene and 4-vinylbenzyl chloride:

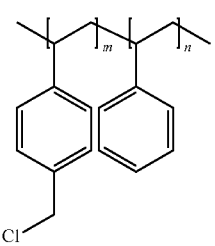

The membranes were prepared by casting the PSMMIM solution prepared above directly onto a flat glass surface. The thickness of the solution on the glass was controlled by a film applicator (MTI Corporation, Richmond, Calif.) with an adjustable doctor blade. The membranes were then dried in a vacuum oven at 80° C. for 300 minutes, and then 120° C. for 200 minutes. Chloride ion in the membranes was removed by soaking the membranes in 1 M KOH solution for 24 hours.

The resultant membrane was tested and determined to meet the classification as a Helper Membrane according to the test set forth in the Summary of the Invention section of the present application. The membrane was sandwiched between the anode and the cathode with the metal layers on the anode and cathode facing the membrane, and the whole assembly was mounted in a Fuel Cell Technologies 5 cm$^2$ fuel cell hardware assembly with serpentine flow fields.

$CO_2$ humidified at 50° C. was fed into the cathode at a rate of 5 sccm, the cell was operated at atmospheric pressure with the anode inlet and outlet left open to the atmosphere, 3.0 V were applied to the cell, and the cathode output composition was analyzed with an Agilent 6890 gas chromatograph (GC)/TCD (Agilent Technologies, Santa Clara, Calif.) equipped with a Carboxen 1010 PLOT GC column (30 m×320 um) (Sigma Aldrich). No heating was applied to the cell.

Initially the cell produced 100 mA/cm$^2$, but the current dropped and held steady at 80 mA/cm$^2$ after a few minutes of operation. GC analysis after 30 minutes of operation showed that the output of the cell contained $CO_2$, CO and a small amount of hydrogen. Selectivity was calculated at 94% where:

$$Selectivity = \frac{(CO \text{ production rate})}{(CO \text{ production rate} + H_2 \text{ production rate})}$$

Therefore PSMMIM is properly classified as a Helper Membrane.

In a second trial, water was fed into the anode of the cell to keep the PSMMIM hydrated. In that case the membrane was able to maintain over 90% selectivity for 200 hours.

During both runs the leakage current was checked and was negligible. Furthermore there were no other products on the cathode. As such, the faradaic efficiency was equal to the Selectivity.

Comparative Example 1

Comparative Example 1 measured the steady state current and faradaic efficiency of an electrolyzer constructed following the teachings of the '583 publication, which claimed to disclose a system that "may provide selectivity of methanol as part of the organic product mixture, with a 30% to 95% faradaic yield for carbon dioxide to methanol, with the remainder evolving hydrogen." However the '583 publication fails to provide data demonstrating a 30% to 95% faradaic yield when the cathode is liquid free. In Comparative Example 1 a cell was built following the teachings in the '583 publication and the faradaic efficiency was measured at room temperature with a liquid free cathode.

Following the teachings in the '583 publication, the cathode was prepared as follows. First a platinum nanoparticle ink was made by mixing 10 mg of platinum black (12755, Alfa Aesar) with 0.2 ml deionized water (18.2 Mohm Millipore) and 0.2 ml isopropanol (3032-16, Macron). The mixture was then sonicated for 1 minute. The platinum nanoparticle ink was then hand-painted onto a gas diffusion layer (Sigracet 35 BC GDL, Ion Power) covering an area of 2.5 cm×2.5 cm.

The platinum catalyst layer was then coated with a thin layer of poly (4-vinylpyridine) (P4VP, average MW: ~60,000, Sigma Aldrich) by brushing 0.2 ml of 1% P4VP ethanol solution. Then the platinum catalyst layer was immersed in 1 M $H_2SO_4$ solution (A300C-212, Fisher Chemical, Pittsburgh, Pa.) to protonate pyridine.

The anode was prepared as in Specific Example 1. Specifically, $RuO_2$ ink was made by mixing 15 mg of $RuO_2$ (11804, Alfa Aesar) with 0.2 ml deionized water (18.2 Mohm Millipore), 0.2 ml isopropanol (3032-16, Macron) and 0.1 ml of 5% Nafion solution (1100EW, DuPont). The $RuO_2$ ink was then hand-painted onto a gas diffusion layer (Sigracet 35 BC GDL, Ion Power) covering an area of 2.5 cm×2.5 cm.

Next a proton exchange membrane (Nafion 117, DuPont) was sandwiched between the anode and cathode with the metal coatings facing the membrane, and the whole assembly was mounted in Fuel Cell Technologies 5 $cm^2$ fuel cell hardware assembly with serpentine flow fields.

The cell was tested using the procedures in Specific Example 1. Specifically $CO_2$ humidified at 50° C. was fed into the cathode at a rate of 5 sccm, the cell was at room temperature and atmospheric pressure, the anode inlet and outlet were left open to the atmosphere, 3.0 V were applied to the cell, and the cathode output composition was analyzed with an Agilent 6890 gas chromatograph (GC)/TCD equipped with a Carboxen 1010 PLOT GC column (30 m×320 um). No heating was applied to the cell.

The total cell current was found to be 80 $mA/cm^2$, but no methanol or other $CO_2$ reduction products could be detected. Instead hydrogen was the only product detected by GC. There was no evidence for methanol condensation in the tubing. Based on the measurements, the selectivity and faradaic efficiency of a cell constructed following the teachings of the '583 publication with a liquid free cathode is near zero. The $CO_2$ current is also near zero at room temperature.

Note that the GC results show that the methanol concentration in the gas phase is negligible, and methanol cannot condense at room temperature until the partial pressure of methanol in the gas phase reaches about 13 kPa, where 13 kPa is the vapor pressure of methanol at room temperature.

SHIRONITA I also was unable to detect $CO_2$ reduction products in a similar experiment, but was able to detect products when heating the cell to 90° C. However in any case the faradaic efficiency was still low.

Table 1 lists the observed faradaic efficiencies and $CO_2$ conversion currents at room temperature for various membranes and catalyst(s) combinations for various cells disclosed in prior research as well as the results from Specific Example 1 and Comparative Example 1. The faradaic efficiencies were calculated after 1 hour in a steady state, constant voltage experiment. In some cases higher efficiencies are reported by cycling the potential. As can be seen, the use of the Helper Membrane raised the faradaic efficiency by roughly a factor of 3 and the product current by a factor of 16.

TABLE 1

| Reference | Faradaic efficiency % | Membrane | Catalyst | Total Current at cell potential 3 V ($mA/cm^2$) | Maximum $CO_2$ Conversion Current at ≤3 V ($mA/cm^2$) |
|---|---|---|---|---|---|
| Delacourt, C., et al., "Design of an Electrochemical Cell Making Syngas (CO + $H_2$) from $CO_2$ and $H_2O$ Reduction at Room Temperature", *J. Electrochem. Soc.* 155 (2008), pages B42-B49. | 0 | Nafion | Ag | Not reported | 0 |
| Dewolf, D., et al. "The electrochemical reduction of $CO_2$ to $CH_4$ and $C_2H_4$ at Cu/Nafion electrodes (solid polymer electrolyte structures)" *Catalysis Letters* 1 (1988), pages 73-80. | 19 | Nafion | Cu | 1 | 0.2 |
| Aeshala, L., et al., "Effect of solid polymer electrolyte on electrochemical reduction of $CO_2$", *Separation and Purification Technology* 94 (2012), pages 131-137. | 15 | Nafion SPEEK | Cu | 5.6 | 0.8 |
|  |  | Alkali doped PVA |  |  |  |

TABLE 1-continued

| Reference | Faradaic efficiency % | Membrane | Catalyst | Total Current at cell potential 3 V (mA/cm$^2$) | Maximum CO$_2$ Conversion Current at ≤3 V (mA/cm$^2$) |
|---|---|---|---|---|---|
| Aeshala, L., et al., "Effect of cationic and anionic solid polymer electrolyte on direct electrochemical reduction of gaseous CO$_2$ to fuel", *Journal of CO$_2$ Utilization* 3 (2013), pages 49-55. | 32 | Acid doped CMI-7000 Alkali doped AMI-7001 | Cu | 6 | 1.7 |
| Genovese, C., et al.. "A Gas-phase Electrochemical Reactor for Carbon Dioxide Reduction Back to Liquid Fuels", *AIDIC Conference Series* 11 (2013), pages 151-160. | 12 | Nafion | Pt/Fe | 20 | 2.4 |
| Aeshala, L., et al., "Electrochemical conversion of CO$_2$ to fuels: tuning of the reaction zone using suitable functional groups in a solid polymer electrolyte", *Phys. Chem. Chem. Phys.* 16 (2014), pages 17588-17594. | 20 | Alkali doped PVA/PEI | Cu | 20 | 4 |
| Specific Example 1 | 94 | PSMMIM | Ag | 80 | 75 |
| Comparative Example 1 | ~0 | Nafion | Pt | 80 | 0 |

Comparative Example 2

Comparative Example 2 was conducted to determine whether Nafion, sulfonated Poly(Ether Ether Ketone) "SPEEK", polyvinyl alcohol (PVA), polyethylenimine (PEI), CMI-7000, AMI 7001, phosphoric acid doped PBI or Neosepta membranes act as Helper Membranes when pretreated as described in the earlier literature as described in Table 1.

Nafion 117 was purchased from Ion Power Technologies, Inc., of Wilmington, Del. It was boiled in 5% H$_2$O$_2$ for 1 hour and it was then boiled in Millipore water for 1 hour. The Nafion 117 was then boiled in 0.5 M sulfuric acid for an hour, and then boiled again in Millipore water for 1 hour.

Neosepta BP-1E was purchased from Ameridia Division of Eurodia Industrie S.A. in Somerset, N.J. It was pretreated by dipping it in water as recommended by the manufacturer. It was then tested to determine whether it met the classification as a Helper Membrane according to the test set forth in the Summary of the Invention section of the present application. The selectivity was 34%, below the 50% require to be classified as a Helper Membrane.

CMI-7000 and AMI-7001 were purchased from Membranes International Inc. of Ringwood, N.J. An alkali doped AMI-7001 was prepared following the procedure outlined in Aeshala, L., et al., "Effect of cationic and anionic solid polymer electrolyte on direct electrochemical reduction of gaseous CO$_2$ to fuel", *Journal of CO$_2$ Utilization* 3 (2013), pages 49-55 ("AESHALA I"). First the AMI-7001 was soaked in a 0.5 molar potassium hydroxide (KOH) solution overnight to create basic sites in the membrane. Excess KOH was then washed off by soaking the membrane in water for 6 hours. The membrane was then tested to determine whether it met the classification as a Helper Membrane according to the test set forth in the Summary of the Invention section of the present application. Both the selectivity (25%) and product current (2.5 mA/cm$^2$) were low, as reported in Table 2 below, indicating that an alkali doped AMI-7001 membrane as pretreated according to AESHALA I is not a Helper Membrane.

Similarly, the acid doped CMI-7000 was pretreated following the procedure outlined in AESHALA I. First the membrane was soaked in 0.5 M H$_2$SO$_4$ overnight, then it was soaked in water for 6 hours. The membrane was then tested to determine whether it met the classification as a Helper Membrane according to the test set forth in the Summary of the Invention section of the present application. GC analysis showed only traces of CO formation, indicating that this membrane is not a Helper Membrane.

Alkali doped PVA was synthesized following the procedure outlined in Aeshala, L., et al., "Effect of solid polymer electrolyte on electrochemical reduction of CO$_2$", *Separation and Purification Technology* 94 (2012), pages 131-137 ("AESHALA II"). PVA (stock #363081) was purchased from Sigma-Aldrich Corporation. 9 grams of PVA were dissolved in 90 ml of water at 90° C. The solution was cast onto a petri dish. After the cast films had dried, they were immersed in glutaraldehyde (10% in acetone solutions) mixed with small quantities of catalytic HCl for one hour to encourage cross-linking. The films were then rinsed several times with Millipore water, activated by immersion in 0.5 M NaOH for 24 hours, and then rinsed before use. The membrane was then tested to determine whether it met the classification as a Helper Membrane according to the test set forth in the Summary of the Invention section of the present application. While the selectivity (52%) was relatively high, the product current (7.5 mA/cm$^2$) was low, as reported in Table 2 below, indicating that an alkali doped PVA membrane as pretreated according to AESHALA II is not a Helper Membrane.

An alkali doped PVA/PEI composite was synthesized following the procedure outlined in Aeshala, L., et al., "Electrochemical conversion of CO$_2$ to fuels: tuning of the reaction zone using suitable functional groups in a solid polymer electrolyte", *Phys. Chem. Chem. Phys.* 16 (2014), pages 17588-17594 (AESHALA III). A PEI (item number 408727) was purchased from Sigma-Aldrich Corporation. 6 grams of PVA and 3 grams of PEI were dissolved in 90 ml of water at 90° C. The solution was cast onto a petri dish. After the cast films had dried, they were immersed in glutaraldehyde (10% in acetone solutions) mixed with small quantities of catalytic HCl for one hour to encourage cross-linking. The films were then rinsed several times with Millipore water. They were then activated by immersion in 0.5 M NaOH for 24 hours and then rinsed before use.

The membrane was then tested to determine whether it met the classification as a Helper Membrane according to the test set forth in the Summary of the Invention section of the present application. Both the selectivity (16%) and the product current (1.6 mA/cm$^2$) were low, as reported in Table 2 below, indicating that an alkali doped PEI/PVA membrane as pretreated according to AESHALA III is not a Helper Membrane.

SPEEK was prepared following the procedure in the procedure outlined in AESHALA II. A PEEK film was purchased from CS Hyde Company (Lake Villa, Ill.). 1 g of the PEEK was exposed to 50 ml of concentrated sulfuric acid for 50 hours under constant agitation. All of the PEEK had dissolved at the end of the 50 hours and had converted to SPEEK. 200 ml of Millipore water was placed in an ice bath and allowed to cool to near 0° C. The SPEEK solution was then slowly poured into the Millipore water under constant agitation. The SPEEK precipitated out of the water solution, was filtered, and was then washed multiple times to remove excess sulfuric acid. The SPEEK was then dried at 100° C. for 8 hours in a vacuum oven. Next the SPEEK was dissolved in dimethylacetamide. The resultant solution was cast on a glass slide. The membrane was then tested to determine whether it met the classification as a Helper Membrane according to the test set forth in the Summary of the Invention section of the present application. Both the selectivity (2.5%) and the product current (0.13 mA/cm$^2$) were low, as reported in Table 2 below, indicating that a SPEEK membrane as pretreated according to AESHALA II is not a Helper Membrane.

Phosphoric Acid doped PBI was prepared as follows. PBI was purchased from PBI Performance Products, Inc. (Rock Hill, S.C.) and acid doped by immersing it in 0.5 M H$_3$PO$_4$ for 24 hours. It was then soaked in water for 1 hour to remove excess acid. The membrane was then tested to determine whether it met the classification as a Helper Membrane according to the test set forth in the Summary of the Invention section of the present application. Again the current and selectivity were low.

Notice that Nafion, SPEEK, alkali doped PVA, alkali doped PVA/PEI, Acid doped CMI-7000, Alkali doped AMI-7001 Neosepta, and P-PBI are not Helper Membranes.

Specific Example 2

The object of this example was to determine whether changes in the membrane doping could activate a membrane for CO$_2$ conversion. AMI-7001 and CMI-7000 were chosen as test examples since they have the same polystyrene backbone as in PSMMIM and PSDMIM, but different amine groups, so they might be able to be activated.

The AMI-7001 was pretreated by soaking the membrane in a 1 M NaCl solution for one hour, followed by soaking in water for about 3 hours.

The selectivity rose to 70%. The current density was still low (3.5 mA/cm$^2$). So this membrane is still not a Helper Membrane but its performance is much better.

The CMI-7000 was pretreated using the same procedure. Again, the selectivity rose to 72%. The current density was still low (15 mA/cm$^2$).

Still, it is likely that the current could be raised if thinner membranes were made with the same bulk composition as AMI-7001 and CMI-7000, and then the membranes were doped with NaCl. Such a membrane could be a Helper Membrane.

Specific Example 3

The objective of Specific Example 3 is to provide another example of a Helper Membrane.

Preparation of PSDMIM: Poly(4-vinylbenzyl chloride-co-styrene) was prepared as in Specific Example 2. 1,2-dimethylimiazole (Sigma-Aldrich) (2.8455 g, 0.0296 mol) is added to the solution of the poly(4-VBC-co-St) (5.0907 g) in anhydrous N,N-Dimethylformamide (DMF) (Sigma-Aldrich) (30 mL). The mixture was stirred at room temperature for 0.5-1 hour, and then heated at 110-120° C. for 66.92 hours. PSDMIM was obtained as a yellowish solid after purification by precipitation into diethyl ether.

A PSDMIM membrane was formed as in Specific Example 2. Then the membrane was tested as in Specific Example 1. The results are given in Table 2 below. PSDMIM refers to a co-polymer of styrene and 1-(p-vinylbenzyl)-2,3-dimethylimidazolium:

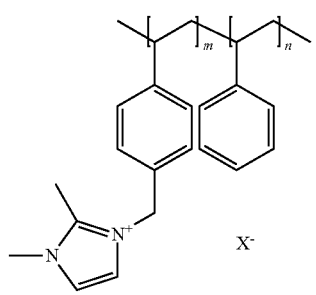

where X$^-$ is a anion and m>0 and n>0.

Specific Example 4

The objective of Specific Example 4 is to provide an example of a Helper Membrane with a pyridinium group.

Preparation of PSMP: poly(4-vinylbenzyl chloride-co-styrene) was prepared as in Specific Example 2. Pyridine (Sigma-Aldrich) is added to the solution of the poly(4-VBC-co-St) (5.0907 g) in anhydrous N,N-Dimethylformamide (DMF) (Sigma-Aldrich) (30 mL). The mixture was stirred at room temperature for 0.5-1 hour, and then heated at 110-120° C. for 66.92 hours. PSMP was obtained as a brownish solid after purification by precipitation into diethyl ether. PSMP refers to a material that contains a co-polymer of styrene and 1-(p-vinylbenzyl)-pyridinium.

A PSMP membrane was formed as in Specific Example 2. The resultant membrane did not have a uniform thickness, but the membrane was still suitable to test. The film was tested as in Specific Example 1 and qualified as a Helper Membrane.

Table 2 shows the faradaic efficacies and currents observed for the Helper Membranes disclosed in this application along with those of the membranes discussed in earlier studies. In all cases the membranes were tested and determined to meet the classification as a Helper Membrane according to the test set forth in the Summary of the Invention section of the present application.

TABLE 2

| | Membrane | Selectivity | Current at 3 V (mA/cm$^2$) | Current for carbon containing products (mA/cm$^2$) |
|---|---|---|---|---|
| Membranes from the previous | Nafion 117 | 0% | 72 | 0 |
| | Neosepta | 34% | 24 | 8 |
| | Acid doped[1] CMI-7000 | 0.02% | 35 | 0.007 |
| | Alkali doped[1] AMI-7001 | 25% | 10 | 2.5 |

TABLE 2-continued

| | Membrane | Selectivity | Current at 3 V (mA/cm$^2$) | Current for carbon containing products (mA/cm$^2$) |
|---|---|---|---|---|
| literature | SPEEK[2] | 2.5% | 5 | 0.13 |
| | Alkali doped PVA[2] | 52% | 15 | 7.5 |
| | Alkali doped PEI/PVA[3] | 16% | 10 | 1.6 |
| | H$_3$PO$_4$ doped PBI | 14.7% | 8 | 1.2 |
| Membranes disclosed here | NaCl doped[4] CMI-7000 | 73% | 21 | 15 |
| | NaCl doped[4] AMI-7001 | 70% | 5 | 3.5 |
| | PSMMIM[4] | 95% | 80 | 75 |
| | PSDMIM[4] | 93% | 80 | 72 |
| | PSMP[4] | 83% | 25 | 20.8 |

[1]Doped following the procedure in AESHALA I.
[2]Doped by the procedure in AESHALA II
[3]Doped by the procedure in AESHALA III
[4]Doped by a procedure disclosed here Specific Example 5

The objective of this example was to examine the effects of the fraction of the amine in the polymer on the performance. The Helper Membrane was made from methylimidazolium-poly(4-vinylbenzylchloride-co-styrene) chloride (PSMIM-Cl) polymer solution of various compositions.

PSMIM-Cl solution (in anhydrous dimethylformamide) was prepared by a two-step reaction process: (1) Poly(4-VBC-co-St) synthesis from the reaction of styrene (St) with 4-vinylbenzyl chloride (4-VBC) in chlorobenzene under argon gas (S.J. Smith, Urbana, Ill.) protection with 2,2'-Azobis(2-methylpropionitrile) (AIBN) as initiator. (2) Poly(4-VBC-co-St) was reacted with 1-methylimidazole at 50-120° C. for more than 48 hours to obtained PSMIM-Cl polymer solution.

Synthesis of poly(4-vinylbenzyl chloride-co-styrene): A solution of inhibitor free styrene (Sigma-Aldrich) (10.0581 g, 96.57 mmol) and 4-vinylbenzyl chloride (Sigma-Aldrich) (6.2323 g, 40.84 mmol) in chlorobenzene (Sigma-Aldrich) (15 ml) was heated at 60-65° C. in an oil bath for 12-18 hours under argon gas with AIBN (Sigma-Aldrich) (0.1613 g, 0.99 wt % based on the total monomers weight) as initiator. The copolymer was precipitated in CH$_3$OH/THF and dried under vacuum. VBC content in the copolymer was 38.26 wt %.

Synthesis of methylimidazolium-poly(4-VBC-co-St) chloride (MIM-poly(4-VBC-co-St)-Cl): 1-methylimiazole (Sigma-Aldrich) (2.8650 g, 0.0349 mol) was added to the solution of the poly(4-VBC-co-St) (5.0034 g) in anhydrous N,N-Dimethylformamide (DMF) (Sigma-Aldrich) (30 ml). The mixture was stirred at room temperature for 0.5-1 hour, and then heated at 110-120° C. for 50.3 hours.

Membranes preparation: The membrane preparation steps were: (1) Cast PSMIM-Cl polymer solution prepared above onto a flat glass (8 cm×10 cm) with a 0.1 to 1 ml pipette. (2) Put the glass plate with membranes in an oven (MTI Corporation); the membranes were then dried at 80° C. for 4 hours and then 120° C. for another 2 hours under the protection of nitrogen. (3) After the oven temperature cooled down to room temperature, the membranes were taken out and soaked in a 1 M KOH (Fisher Scientific, Fair Lawn, N.J.) bath. Membranes were peeled off from the substrates and soaked in 1 M KOH solution for at least 24 hours for complete anion exchange (Cl$^-$→OH$^-$) before testing.

The synthesis procedure for the PSMIM-Cl polymer solution with VBC content of 38.26 wt % and the membrane fabrication procedure were used for the synthesis of PSMIM-Cl with VBC compositions of 46 wt % and 59 wt % respectively. The testing results of these membranes are summarized in Table 3 below. Membrane current density increases with increasing functional group VBC content in the copolymer, while mechanical strength of membranes get worse. The membrane with 59 wt % VBC is very soft and its mechanical strength is very weak.

TABLE 3

| Membrane # | 1 | 2 | 3 |
|---|---|---|---|
| VBC in copolymer (wt %) | 38 | 46 | 59 |
| Cell potential (V) | 3.0 | 2.8 | 2.8 |
| Current (mA/cm$^2$) | 52 | 60 | 130 |
| CO selectivity (%) | 94.38 | 93.35 | 94.88 |

Fitting the data to an exponential curve, and extrapolating to lower VBC content shows that the current will be above 20 mA/cm$^2$ whenever there is at least 15% VBC in the polymer. This corresponds to a styrene to (p-vinylbenzyl)-3-methyl-imidazolium ratio of no more than 7.

Specific Example 6

The objective of this example is to provide examples of reinforced helper membranes. In particular, Helper Membranes will be provided made from blends of methylimidazolium-poly(4-vinylbenzylchloride-co-styrene) chloride (PSMIM-Cl) and polymer matrix such as polybenzimidazole (PBI), poly(2,6-dimethyl-1,2-phenylene oxide) (PPO), Nylon 6/6, or polyethylene (PE).

PSMIM-Cl solution (in anhydrous dimethylformamide) was prepared by a two-step reaction process: (1) poly(4-VBC-co-St) was synthesized from the reaction of styrene (St) with 4-vinylbenzyl chloride (4-VBC) in chlorobenzene under argon gas (S.J. Smith) protection with 2,2'-Azobis(2-methylpropionitrile) (AIBN) as initiator; 2) poly(4-VBC-co-St) was reacted with imidazole at 50-120° C. for more than 48 hours to obtained PSMIM-Cl solution.

PBI polymer solution was prepared by diluting 27.5264 g of about 26.6 wt % PBI solution (PBI Performance Products. Inc., Charlotte, N.C.) with anhydrous dimethylacetamide (DMAc) (Sigma Aldrich) to 78.3578 g. The concentration of the resulting PBI solution was 9.34 wt %.

Nylon 6/6 solution was prepared by adding 4.6065 g of Nylon 6/6 (Sigma Aldrich) into 24.3218 g of about 97% formic acid (Acros Organics, Geel, Belgium) and 2.5625 g anhydrous methanol (Avantor Performance Materials Inc.) mixture. Nylon pellets were allowed to dissolve for several hours at room temperature, then in a Branson 2510 sonication bath (Sonics Online, Richmond, Va.) until a homogeneous white emulsion was obtained. The concentration of the resulting Nylon solution is 14.83 wt %.

10.2 wt % PPO solution was prepared by dissolving 0.5099 g of PPO (Sigma Aldrich) in 5 mL chlorobenzene (Fisher Scientific).

15 wt % PE solution was prepared by dissolving 4.5 g of PE (Sigma Aldrich) in 30 ml xylenes (Fisher Scientific). PE completely dissolved in xylenes at 70-80° C.

Preparation procedure of Helper Membrane #4 from blends of PSMIM-Cl and PBI: (1) Add 0.1 ml PBI polymer solution into 4 ml PSMIM-Cl solution (VBC content in the copolymer was 46 wt %) and light brown precipitate was immediately formed. The solid in the polymer solution was dispersed by ultra-sonication with an ultrasonic probe (tip diameter 3 mm) (Sonic & Materials. Inc., Newtown, Conn.) until a homogeneous brown emulsion was obtained. (2) Cast the resulting polymer solution on a glass plate (8 cm×10 cm) with a 0.1 to 1 ml pipette. (3) Put the glass plate with membranes in an oven (MTI Corporation); the membranes were then dried at 80° C. for 4 hours and then 120° C. for another 3 hours under the protection of nitrogen. (4) After oven temperature cooled down to room temperature, take the membranes out and soaked in a 1M KOH (Fisher Scientific) bath, membranes were peeled off from the substrates and soaked in 1 M KOH solution for at least 24 hours for complete anion exchange (Cl⁻→OH⁻) before testing.

The obtained light brown PSMIM-Cl and PBI blend membranes were transparent and homogeneous with very good mechanical strength.

The PSMIM-Cl and PBI blend membrane #4 preparation procedure was used for the preparation of PSMIM-Cl and PBI blend membranes #5, 6 and 7. The ratio of PSMIM-Cl solution to PBI solution was varied, as shown in Table 4 below.

The membranes were tested and determined to meet the classification as a Helper Membrane according to the test set forth in the Summary of the Invention section of the present application. The testing results are summarized in Table 4 below.

TABLE 4

| Membrane # | 4 | 5 | 6 | 7 |
|---|---|---|---|---|
| VBC in copolymer (wt %) | 46 | 46 | 46 | 59 |
| PSMIM-Cl (ml) | 4 | 2 | 4 | 4 |
| PBI (ml) | 0.1 | 0.25 | 0.5 | 0.5 |
| Functional group in blend membrane (wt %) | 45.29 | 42.67 | 42.67 | 55.04 |
| Cell potential (V) | 3 | 3 | 3 | 3 |
| Current (mA/cm$^2$) | 105 | 70 | 86 | 104 |
| CO selectivity (%) | 88.95 | 88.75 | 92.31 | 93.22 |

Preparation procedure of Helper Membrane from blends of PSMIM-Cl and PPO: (1) Add 0.5 ml of 10.2 wt % PPO polymer solution into 4 ml of PSMIM-Cl solution (VBC content in copolymer was 46 wt %) and white precipitate was immediately formed. The solid in the polymer solution was dispersed by ultra-sonication with an ultrasonic probe (tip diameter 3 mm) (Sonic & Materials. Inc.) until no obvious large particles were observed. (2) The resulting polymer solution was cast on a glass plate (8 cm×10 cm) with a 0.1 to 1 ml pipette. Polymer phase separation was observed. (3) The glass plate with membranes was put in an oven (MTI Corporation); the membranes were then dried at 80° C. for 4 hours and then 120° C. for another 3 hours under the protection of nitrogen. (4) After the oven temperature cooled down to room temperature, the membranes were taken out and soaked in a 1 M KOH (Fisher Scientific) bath, membranes were peeled off from the substrates and soaked in 1 M KOH solution for at least 24 hours for complete anion exchange (Cl⁻→OH⁻) before testing.

The dried PSMIM-Cl and PPO blend membrane was transparent, and it turned white in KOH solution. The membrane mechanical strength was good.

The membranes were tested and determined to meet the classification as a Helper Membrane according to the test set forth in the Summary of the Invention section of the present application. The testing results are summarized in Table 5 below.

TABLE 5

| Membrane # | 8 |
|---|---|
| VBC in copolymer (wt %) | 46 |
| PSMIM-Cl (ml) | 4 |
| PPO (ml) | 0.5 |
| Functional group in blend membrane (wt %) | 42.42 |
| Cell potential (V) | 3 |
| Current (mA/cm$^2$) | 105 |
| CO selectivity (%) | 87.17 |

Preparation procedure for Helper Membrane #9 from blends of PSMIM-Cl and Nylon: (1) Added 1 ml 14.83 wt % nylon polymer solution into 4 ml PSMIM-Cl solution (VBC content in copolymer was 38 wt %) and white precipitate was immediately formed. The solid in the polymer solution was dispersed by ultra-sonication with an ultrasonic probe (tip diameter 3 mm) (Sonic & Materials. Inc.) until a homogeneous polymer solution was obtained. (2) The resulting polymer solution was cast on a glass plate (8 cm×10 cm) with a 0.1 to 1 ml pipette. (3) The membrane was air dried in the hood at room temperature overnight. (4) The glass plate with membranes was put in an oven (MTI Corporation); the membranes were then dried at 80° C. for 4 hours and then 120° C. for another 3 hours under nitrogen protection. (5) After the oven temperature cooled down to room temperature, the membranes were taken out and soaked in a 1 M KOH (Fisher Scientific) bath, then the membranes were peeled off from the substrates and soaked in 1 M KOH solution for at least 24 hours for complete anion exchange (Cl⁻→OH⁻) before testing.

The obtained PSMIM-Cl and Nylon membrane was off-white and homogenous with decent mechanical strength.

The PSMIM-Cl and Nylon blend membrane #9 preparation procedure was used for the preparation of PSMIM-Cl and Nylon blend membranes #10. The ratio of PSMIM-Cl solution to Nylon solution was varied.

The membranes were tested and determined to meet the classification as a Helper Membrane according to the test set forth in the Summary of the Invention section of the present application. The testing results are summarized in Table 6 below.

TABLE 6

| Membrane # | 9 | 10 |
|---|---|---|
| VBC in copolymer (wt %) | 38 | 46 |
| PSMIM-Cl (ml) | 4 | 4 |
| Nylon (ml) | 1 | 0.5 |
| Functional group in blend membrane (wt %) | 30.00 | 40.94 |
| Cell potential (V) | 3 | 3 |
| Current (mA/cm$^2$) | 26 | 66 |
| CO selectivity (%) | 56.40 | 84.58 |

Preparation procedure for Helper Membrane #11 from blends of PSMIM-Cl and PE: (1) 1 ml 15 wt % PE hot polymer solution was added into 4 ml of PSMIM-Cl solution (VBC content in copolymer was 46 wt %) and a white precipitate was immediately formed. The solid in the polymer solution was dispersed by ultra-sonication with an ultrasonic probe (tip diameter 3 mm) (Sonic & Materials. Inc.) until a homogeneous polymer solution was obtained. (2) The resulting polymer solution was cast on a glass plate (8 cm×10 cm) with a 0.1 to 1 ml pipette. Polymer phase separation was observed. (3) The glass plate with membranes was put in an oven (MTI Corporation); the membranes were then dried at 80° C. for 4 hours and then 120° C. for another 3 hours under nitrogen protection. (4) After the oven temperature cooled down to room temperature, the membranes were taken out and soaked in a 1M KOH (Fisher Scientific) bath, then the membranes were peeled off from the substrates and soaked in 1 M KOH solution for at least 24 hours for complete anion exchange (Cl⁻→OH⁻) before testing.

The obtained PSMIM-Cl and PE membrane was off-white with decent mechanical strength.

The PSMIM-Cl and PE blend membrane #11 preparation procedure was used for the preparation of PSMIM-Cl and PE blend membrane #12. The ratio of PSMIM-Cl solution to PE solution is shown in Table 7 below.

The membranes were tested and determined to meet the classification as a Helper Membrane according to the test set forth in the Summary of the Invention section of the present application. The test results are summarized in Table 7 below.

TABLE 7

| Membrane # | 11 | 12 |
|---|---|---|
| VBC in copolymer (wt %) | 46 | 59 |
| PSMIM-Cl (ml) | 4 | 4 |
| PE (ml) | 0.5 | 0.5 |
| Functional group in blend membrane (wt %) | 40.89 | 52.74 |
| Cell potential (V) | 3 | 3 |
| Current (mA/cm$^2$) | 51.0 | 72 |
| CO selectivity (%) | 73.71 | 92.15 |

Notice that these four polymer mixtures are Helper Membranes, and they are all stronger than PSMMIM.

Many polymers related to PBI, PPO, Nylon and PE could also be added to the membrane to improve its strength. PE is a polyolefin. Other polyolefins and chlorinated or fluorinated polyolefins could also be blended with PSMMIM to produce a helper catalyst. PBI contains cyclic amines in its repeat unit. Other polymers containing cyclic amines could also be blended with PSMMIM to produce a Helper Membrane. PPO contains phenylene groups. Other polymers containing phenylene or phenyl groups could also be blended with PSMMIM to produce a Helper Membrane. Nylon contains amine and carboxylate linkages. Other polymers containing amine or carboxylate linkages could also be blended with PSMMIM to produce a Helper Membrane.

Specific Example 7

The objective of this example is to identify a Helper Membrane that does not contain styrene. In particular it will be shown that a terpolymer of methyl methacrylate (MMA), butyl acrylate (BA), and the 1-methyl imidazole adduct of VBC, which will be referred to as methylimidazolium-poly (vinylbenzylchloride-co-methyl methacrylate-co-butylacrylate) chloride (PVMBMIM-Cl) is a Helper Membrane.

PVMBMIM-Cl solution was prepared by a two-step reaction process: (1) poly(VBC-co-MMA-co-BA) synthesis from the reaction of 4-vinylbenzyl chloride (VBC), methyl methacrylate (MMA) and butylacrylate (BA) in toluene under nitrogen gas (S.J. Smith) protection with 2,2'-Azobis(2-methylpropionitrile) (AIBN) as initiator; then (2) reacting poly (VBC-co-MMA-co-BA) with 1-methylimidazole at room temperature for more than 24 hours to obtained PVMBMIM-Cl polymer solution.

Synthesis of poly(4-vinylbenzyl chloride-co-methyl methacrylate-co-butylacrylate): monomers (Sigma-Aldrich) (MMA: 4.511 g, BA: 4.702 g, VBC: 4.701 g) were polymerized in toluene (Sigma-Aldrich) (25 ml) with AIBN (0.0811 g) as initiator. The reaction was kept at 50-55° C. for 41.62 hours under nitrogen protection with vigorous stirring. Terpolymer was precipitated out in methanol (Avantor Performance Materials Inc.) and washed with methanol for several times. The obtained polymer powder was dried in an oven at 80° C. for 2 hours and then 120° C. for another 2 hours. 6.4319 g polymer powder was collected (yield: 46.23%). VBC content in the copolymer was 33.79 wt %.

Synthesis of methylimidazolium-poly(VBC-co-MMA-co-BA) chloride (PVMBMIM-Cl): 1-methylimidazole (Sigma-Aldrich) (0.55 ml, 0.5616 g) was added to the solution of the poly(VBC-co-MMA-co-BA) (2.06 g) in anhydrous N,N-Dimethylformamide (DMF) (Sigma-Aldrich) (15 ml). The mixture was stirred at room temperature for more than 26 hours.

Membrane preparation: 1) PVMBMIM-Cl polymer solution prepared above was cast onto a flat glass (8 cm×10 cm) with a 0.1 to 1 ml pipette. (2) The membrane was air dried at room temperature for overnight. (3) The glass plate with membranes was put in an oven (MTI Corporation); the membranes were then dried at 80° C. for 2 hours and then 120° C. for another 2 hours under the protection of nitrogen. (4) After the oven temperature cooled down to room temperature, the membranes were taken out and soaked in a 1 M KOH (Fisher Scientific) bath. Membranes were peeled off from the substrates and soaked in 1 M KOH solution for at least 24 hours for completely anion exchange (Cl⁻→OH⁻) before testing.

The PVMBMIM-Cl membrane was transparent with very good mechanical strength. The membranes were tested according to the test set forth in the Summary of the Invention section of the present application with results set forth in Table 8 below.

TABLE 8

| Membrane # | 13 |
|---|---|
| VBC in terpolymer (wt %) | 33.79 |
| Cell potential (V) | 2.8 |
| Current (mA/cm$^2$) | 68 |
| CO selectivity (%) | 90.56 |

The membranes were tested and determined to meet the classification as a Helper Membrane according to the test set forth in the Summary of the Invention section of the present application. The membrane supported 55 mA/cm$^2$ of $CO_2$ conversion current at an applied potential of 2.8 V. The selectivity was about 90%. Therefore, PVMBMIM is a Helper Membrane.

Specific Example 8

The objective of this example is to demonstrate that hydrophilic materials can be added to the membrane to improve water retention. In this example, hygroscopic oxide materials were introduced during the membrane preparation to improve water uptake and water retention in the membrane. Hygroscopic oxide materials include silica ($SiO_2$), zirconia ($ZrO_2$), and titania ($TiO_2$). In this example, zirconia was tested.

Zirconium (IV) propoxide (70 wt. % in propanol, 333972, Sigma-Aldrich) was mixed with the polymer solution prepared as set forth in Specific Example 1 for the synthetic route depicted in FIG. 3 to 15 wt % in DMF. The mixture was sonicated in an ultrasonic bath for 30 minutes to obtain a homogeneous solution. The solution containing zirconia was cast to form a membrane on a glass slide following the procedure set forth in Specific Example 1 for casting the PSMMIM solution. The membrane was dried at 80° C. for 1 hour and 120° C. for 30 minutes in a vacuum oven. Then the membrane was detached from the glass slide in 1 M KOH solution and allowed to exchange to the hydroxide form. The membrane was rinsed with deionized water to remove free KOH and was sandwiched between an Ag cathode and a $RuO_2$ anode following the procedure set forth in the Summary of the Invention section of the present application to classify as a Helper Membrane. The whole assembly was mounted in a Fuel Cell Technologies 5 $cm^2$ fuel cell hardware assembly. The membrane showed 60 $mA/cm^2$ at 2.8 V with 84% selectivity so the membrane is a Helper Membrane.

Specific Example 9

The objective of this example is to demonstrate that a deliquescent material, ZnBr, can be added to the membrane to improve water retention.

The cathode was prepared as follows. First a silver nanoparticle ink was prepared via the addition of 50 mg of silver nanoparticles (20-40 nm, 45509, Alfa Aesar) to 0.8 mL of deionized water (18.2 Mohm, Millipore) and 0.4 mL of isopropanol (3032-16, Macron). The mixture was then sonicated for one minute. The resulting silver ink was air-brushed onto carbon fiber paper (Toray Paper 120, 40% wet-proofing, Toray Industries Inc., Tokyo, Japan) covering an area of 5 cm×5 cm. This square was then cut into four equally-sized squares of 2.5 cm×2.5 cm each.

The anode was prepared the same way in each cell, as follows. First a ruthenium oxide nanoparticle ink was prepared via the addition of 50 mg of $RuO_2$ nanoparticles (11804, Alfa Aesar) to 0.8 mL of deionized water (18.2 Mohm, Millipore) and 0.4 mL of isopropanol (3032-16, Macron). The mixture was then sonicated for one minute. The resulting $RuO_2$ ink was air-brushed onto carbon fiber paper (Toray Paper 120, 40% wet-proofing) covering an area of 5 cm×5 cm. This square was then cut into four equally-sized squares of 2.5 cm×2.5 cm each.

For the cell with ZnBr added to the membrane surface, 25 mg of ZnBr (Sigma Aldrich, 02128) were spread across the surface of a PSMMIM membrane prepared as set forth in Specific Example 5 for the synthesis of poly(4-vinylbenzyl chloride-co-styrene). For the cell with ZnBr incorporated into the membrane solution, 7.5 mg of ZnBr were added to 3 ml of membrane solution prior to casting. The PSMMIM membrane was then cast and prepared in the typical fashion as described previously.

For each cell, the cathode, PSMIM membrane, and anode were sandwiched together such that the metal catalysts of each electrode faced the membrane. The assembly was mounted in a Fuel Cell Technologies 5 $cm^2$ fuel cell hardware assembly with serpentine graphite flow fields.

Each cell was tested by holding the cell at 2.8 V for at least one hour. Air was permitted to flow over the anode flow field while humidified $CO_2$ was passed through the cathode flow field at a flow rate of 15 sccm.

In the case of the membrane with a ZnBr coating, the initial current was only 22 $mA/cm^2$ but it was very stable. No membrane dry-out was detected.

The membrane that had been soaked in ZnBr initially showed 60 $mA/cm^2$ current, but fell to 22 $mA/cm^2$ after about 1 hour.

Still, both membranes are Helper Membranes.

Specific Example 10

The objective of this experiment is to demonstrate that Helper Membranes are useful for water electrolyzers.

A 50-300 micron thick PSMMIM membrane was synthesized as in Specific Example 1. The membrane was sandwiched between the anode and the cathode with the catalysts facing the membrane. A cathode is prepared as follows: a cathode ink was made by mixing 30 mg of $IrO_2$ nanoparticles (A17849, Alfa Aesar) with 0.2 ml deionized water (18.2 Mohm, Millipore) and 0.4 ml isopropanol (3032-16, Macron). The mixture was then sonicated for 1 minute. The cathode ink was sprayed onto a gas diffusion layer (Sigracet 35 BC GDL, Ion Power) covering an area of 2.5 cm×2.5 cm. An anode was prepared as follows: a catalyst ink was made by mixing 15 mg of Pt black (43838, Alfa Aesar) with 0.2 ml deionized water (18.2 Mohm Millipore), 0.2 ml isopropanol (3032-16, Macron). The anode catalyst ink was hand-painted onto a gas diffusion layer (Sigracet 35 BC GDL, Ion Power) covering an area of 2.5 cm×2.5 cm. The whole assembly was mounted in Fuel Cell Technologies 5 $cm^2$ fuel cell hardware assembly with serpentine flow fields. A 1 M KOH solution of water is fed to both cathode and anode chambers at a flow rate of 5 sccm. The cell was run at room temperature either potential dynamically or at constant current. For instance, the current output was 300 and 400 $mA/cm^2$ at a cell potential of 1.8 V and 1.9 V, respectively.

The use of an anion exchange membrane also enables the use of non-precious metal as catalysts. Nickel foam (EQ-bcnf-16m, MTI) was used as both cathode and anode. A current density of 80 $mA/cm^2$ was achieved at a cell potential of 2 V and room temperature.

Specific Example 11

This example shows that Helper Membranes are also useful for alkaline membrane fuel cell power generator.

Pt black (43838, Alfa Aesar) was used as the catalysts for both cathode and anode. The catalysts ink was made by mixing 15 mg of Pt black with 0.4 ml of anion exchange polymer solution (1 wt % in DMF) and was hand-painted onto a gas diffusion layer (Sigracet 35 BC GDL, Ion Power) covering an area of 2.5 cm×2.5 cm. The electrodes were dried under vacuum at 120° C. for 30 minutes. A 50-300 micrometer thick membrane prepared as set forth in Specific Example 1 for the preparation of the first inhibitor-free styrene was sandwiched between cathode and anode, with the respective catalysts facing the membrane. The entire assembly was mounted in Fuel Cell Technologies 5 $cm^2$ fuel cell hardware assembly with serpentine flow fields. $H_2$ and $O_2$ were humidified via 350 cc water bottles at room temperature, and were fed to anode and cathode chambers at 20 ccm, respectively. The cell was run at room temperature and atmosphere pressure. The cell was conditioned by repeatedly applying a cell potential of 0.3 V and 0.6 V for 1 hour until the cell performance was stable. Currents of 60 mA and 150 mA were achieved at 0.6 V and 0.2 V, respectively. A power of 36 mW was attained at ambient conditions.

Specific Example 12

The objective of this example is to provide a Helper Membrane made from methylimidazolium-poly(2,6-dimethyl-1,4-phenylene oxide) bromide (PPOMIM-Br) polymer solution.

PPOMIM-Br solution was prepared by a two-step reaction process: (1) Methyl-brominated poly(2,6-dimethyl-1,4-phenylene oxide) (PPO-Br) synthesis from the reaction of poly (2,6-dimethyl-1,4-phenylene oxide) (PPO) with N-bromosuccinimide (NBS) in chlorobenzene under argon gas (S.J. Smith) protection with 2,2'-Azobis(2-methylpropionitrile) (AIBN) as initiator. (2) PPO-Br was reacted with 1-methylimidazole at room temperature to 60° C. for more than 15 hours to obtained PPOMIM-Br polymer solution.

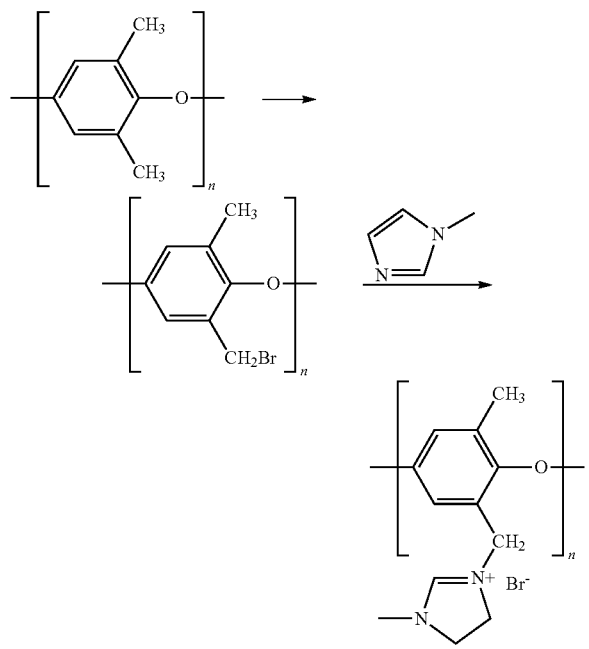

Synthesis of methyl-brominated poly(2,6-dimethyl-1,4-phenylene oxide) (PPO-Br). PPO-Br #14 with low bromination ratio was synthesized according to the literature (Reactive & Functional Polymers 70 (2010) 944-950), a detail procedure can be summarized as follows: NBS (2.84 g, 15.96 mmol) (Sigma-Aldrich) and AIBN (0.12 g, 0.73 mmol) were added to a solution of PPO (2.839, 24.08 mmol) (Sigma-Aldrich) in chlorobenzene (200 ml). The mixture was stirred at 125-135° C. for 4-6 hours under nitrogen protection, the reaction mixture was then added to excess methanol to precipitate the product. After filtration and washing with methanol for several times, the polymer was dried at room temperature under vacuum for more than 2 days. 2.45 g of light yellow powder was collected (yield: 51.14%). The bromination ratio of PPO-Br was calculated from the integration of the NMR methyl peak and methylene peak (18.3%):

$$X_{CH_2Br}(\%) = \frac{3 \times I_{CH_2}}{2 \times I_{CH_3} + 3 \times I_{CH_2}} \times 100\%$$

PPO-Br membrane #14a with high bromination ratio was synthesized according to the literature (Journal of Membrane Science 425-426 (2013) 131-140), a detail procedure can be summarized as follows: NBS (6.27 g, 35.2 mmol) (Sigma-Aldrich) and AIBN (0.4 g, 2.4 mmol) were added to a solution of PPO (2.89, 24.1 mmol) (Sigma-Aldrich) in chlorobenzene (160 ml). The mixture was stirred at 125-135° C. for 18 hours under nitrogen protection, the reaction mixture was then added to excess Methanol to precipitate the product. After filtration and washing with methanol for several times, the polymer was dried at room temperature under vacuum for more than 2 days. 3.04 g of light yellow powder was collected (yield: 63.4%). Bromination ratio: 56.6%.

Synthesis of methylimidazolium-poly(2,6-dimethyl-1,4-phenylene oxide) bromide (PPOMIM-Br membrane #14): 1-methylimiazole (Sigma-Aldrich) (0.37 ml, 4.6 mmol) was added to the solution of the PPO-Br membrane #14 (1.0 g) in 15 ml tetrahydrofuran (THF) (Sigma-Aldrich) and 5 ml methanol (Avantor Performance Materials Inc.). The mixture was refluxed at 55-65° C. for 18 hours.

Synthesis of methylimidazolium-poly(2,6-dimethyl-1,4-phenylene oxide) bromide (PPOMIM-Br membrane #14a): 1-methylimiazole (Sigma-Aldrich) (0.67 ml, 8.5 mmol) was added to the solution of the PPO-Br membrane #14a (1.5 g) in 24 ml tetrahydrofuran (THF) and 8 ml methanol. The mixture was stirred at room temperature to 65° C. for 18 hours. Brown polymer separated from the solution at the end of the reaction.

Membrane preparation: (1) Cast PPOMIM-Br #14 polymer solution prepared above onto a flat glass (8 cm×10 cm) with a 0.1 to 1 ml pipette. (2) The membrane was air dried at room temperature for overnight for solvent evaporation. (3) The membrane was soaked in a 1 M KOH (Fisher Scientific) bath for at least 24 hours for complete anion exchange (Cr⁻ →OH⁻) before testing.

PPOMIM-Br membrane #14a polymer solution was taken after 4 hours reaction of PPO-Br with 1-methylimidazole at room temperature for membrane casting. PPOMIM-Br membrane #14a membrane was very soft and mechanical strength was very weak. The text results are set forth in Table 9 below.

TABLE 9

| Membrane # | 14 |
|---|---|
| Bromination ratio (%) | 18.3 |
| Cell potential (V) | 3.0 |
| Current (mA/cm²) | 14 |
| CO selectivity (%) | 31.5 |

Specific Example 13

The objective of this example is to determine whether a methylimidazolium-poly(4-vinylbenzylchloride membrane with no styrene is also a Helper Membrane.

The objective of this example is to provide a Helper Membrane made from methylimidazolium-poly(vinylbenzylchloride) chloride (PVMIM-Cl) polymer solution.

PVMIM-Cl solution was prepared from commercial available poly(vinylbenzyl chloride) (PVBC) and 1-methylimidazole as shown in the structural diagram below.

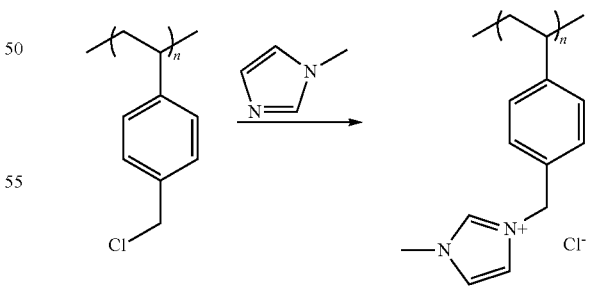

Synthesis of methylimidazolium-PVBC (PVMIM-Cl): 1-methylimiazole (Sigma-Aldrich) (2.33 ml, 29.23 mmol) was added to the solution of the PVBC (Sigma-Aldrich) (4.9466 g) in anhydrous N,N-Dimethylformamide (DMF) (Sigma-Aldrich) (40 mL). The mixture was stirred at room temperature for 46.9 hours. PVMIM-Cl polymer solution was not stable and not suitable for long time storage.

Membranes preparation: (1) Cast PVMIM-Cl polymer solution prepared above onto a flat glass (8 cm×10 cm) with a 0.1 to 1 ml pipette. (2) Put the glass plate with membranes in an oven (MTI Corporation); the membranes were then dried at 80° C. for 4 hours and then 120° C. for another 2 hours under the protection of nitrogen. (3) After the oven temperature cooled down to room temperature, the membranes were taken out and soaked in a 1 M KOH (Fisher Scientific) bath. Membranes were peeled off from the substrates and soaked in 1 M KOH solution for at least 24 hours for complete anion exchange (Cl$^-$→OH$^-$) before testing.

In this case, when the membrane was exposed to water, it swelled to form a gel-like structure which was too soft to test. So it is uncertain as to whether the membrane is a Helper Membrane. This example indicates that methylimidazolium-poly(4-vinylbenzylchloride membrane with no styrene, PBI or other copolymers is not a suitable membrane. Instead, at least 10% of one of another polymer such as styrene or PBI is needed to make a suitable membrane.

Specific Example 14

The objective of this example is to provide a Helper Membrane made from blends of poly(vinylbenzyl chloride) (PVBC) and polybenzimidazole (PBI).

Two methods were tired for the preparation of Helper Membrane from PVBC and PBI. (1) A PBI and PVBC crosslinked membrane was prepared, which was then reacted with 1-methylimidazole. (2) PBI and PVBC were crosslinked in the solution and 1-methylimidazole was added during the crosslinking process.

Membrane preparation procedure from the first method: (1) Prepared 2 wt % (in DMAc) PBI and 2 wt % PVBC (in DMAc) solution polymer solution. (2) Added 3.2 ml PBI (2 wt %) solution into 2 wt % PVBC solution (2 ml). (3) The mixtures were kept at room temperature and ultrasonicated for 1 hour. (4) The resulting polymer solution was cast on a glass plate (8 cm×10 cm) with a 0.1 to 1 ml pipette. (5) The glass plate with membranes was put in an oven (MTI Corporation); the membranes were then dried at 70° C. overnight and then 120° C. for another 3 hours under vacuum. (6) After the oven temperature cooled down to room temperature, the membranes were taken out and soaked in DI water. (7) The membrane was dried at 200° C. for 1 hour. (8) The PVBC/PBI membrane was soaked in 1-methylimidazole solution for 2 days. (9) The membrane was rinsed with DI water and the membrane was then soaked in a 1 M KOH (Fisher Scientific) bath for at least 24 hours for complete anion exchange (Cl$^-$→OH$^-$) before testing.

The membranes were tested according to the test protocol set forth in the Summary of the Invention section of the present application with results set forth in Table 10 below.

TABLE 10

| Membrane # | 15 | 16 |
|---|---|---|
| PVBC (ml) | 2 | 2 |
| PBI (ml) | 3.2 | 2 |
| Functional group in blend membrane (wt %) | 38.46 | 50 |
| Cell potential (V) | 2.8 | 2.8 |
| Current (mA/cm$^2$) | 10 | 33 |
| CO selectivity (%) | 14.96 | 53.81 |

Membrane #17 preparation procedure: (1) 16.83 mmol PVBC was dissolved in 20 ml dimethylacetamide (DMAc). (2) 1.01 mmol PBI (in 15 ml DMAc) solution was added into the PVBC/DMAc solution. (3) A heater was turned on to increase temperature gradually to 90° C. for crosslinking of PBI with PVBC; part of polymer solution turned into gel after 2-3 hours reaction. (4) The heater was turned off and to let the solution cool to room temperature, then 15.1 mmol 1-methylimidazole was added to the polymer solution and the reaction was kept at room temperature for 4-6 hours. (5) The polymer solution was cast onto a flat glass plate (8 cm×10 cm) with a 0.1 to 1 ml pipette. (6) The glass plate with membranes was put in an oven (MTI Corporation); the membranes were then dried at 70° C. overnight and then 120° C. for another 3 hours under vacuum. (7) After the oven temperature cooled down to room temperature, the membranes were taken out and soaked in 1 M KOH bath for at least 24 hours for complete anion exchange (Cl$^-$→OH$^-$) before testing.

The membranes were tested according to the test protocol set forth in the Summary of the Invention section of the present application with results set forth in Table 11 below.

TABLE 11

| Membrane # | 17 |
|---|---|
| Functional group in blend membrane (wt %) | 81.75 |
| Cell potential (V) | 2.8 |
| Current (mA/cm$^2$) | 43 |
| CO selectivity (%) | 93.22 |

This result shows that unlike the membrane that was 100% methylimidazolium-poly(vinylbenzylchloride), a membrane with 81.75% methylimidazolium-poly(vinylbenzylchloride) is still a Helper Membrane. Extrapolation of the data indicates that up to 90% methylimidazolium-poly(vinylbenzylchloride) can be present in the membrane, and still have suitable performance.

Specific Example 15

The objective of this example is to illustrate a procedure to convert $CO_2$ to formic acid in an electrochemical device by using a tin cathode catalyst and the PBI/PSMIM-Cl anion exchange membrane #6 in Table 4 above.

The electrolysis was conducted in an electrolysis cell with an anode, a cathode and an anion exchange membrane assembled in a modified 5 cm$^2$ fuel cell hardware assembly (Fuel Cell Technologies) with gas and liquid channels and serpentine flow fields.

The anode in this example was prepared as follows. A $RuO_2$ ink solution was prepared by mixing 18 mg of $RuO_2$ (11804, Alfa Aesar) and 2 mg of graphene nanoplatelets (A-12, Graphene Laboratories, Calverton, N.Y.) with 0.4 ml deionized water (18.2 Mohm Millipore water), 0.4 ml isopropanol (3032-16, Macron) and 0.14 ml of 5% Nafion solution (1100EW, DuPont). The $RuO_2$ ink was sonicated for 1 min and then hand-painted onto a gas diffusion layer (TGP-H-120 40% wet proofing Toray Paper, Fuel Cell Earth, Woburn, Mass.) with an area of 3.0 cm×3.0 cm.

The cathode in this example was prepared as follows. A Sn ink solution was prepared by mixing 18 mg of Sn nanoparticles (60-80 nm) (SN-M-04-NP, American Elements, Los Angeles, Calif.) and 2 mg of graphene nanopowders (A-12, Graphene Laboratories) with 0.4 ml deionized water (18.2 Mohm Millipore water), 0.4 ml isopropanol (3032-16, Macron) and 0.14 ml of 5% Nafion solution (1100EW, DuPont). The Sn ink solution was sonicated for 1 min and then hand-painted onto a gas diffusion layer (TGP-H-120 40% wet proofing Toray Paper, Fuel Cell Earth) with an area of 3.0 cm×3.0 cm.

The anion exchange membrane used for this test was PBI/PSMIM-Cl membrane #6, as described above in Table 4. Before use, the membrane was soaked in 1 M KOH solution for at least 12 hours.

The electrolyte solution was prepared with deionized water (18.2 Mohm Millipore water).

In this example, 10 mL of catholyte was subjected to recirculation run for 5 hours, while 20 mL anolyte was replaced with fresh anolyte solution after every 1 hour of electrolysis.

The formate produced was detected and analyzed as follows. The formate produced was first subjected to derivitization at 60° C. for 1 hour in the presence of 2% sulfuric acid solution in ethanol. The product was then analyzed by an Agilent Technologies 6890N GC/5973 MS equipped with a Phenomenex Zebron ZB-WAX-Plus capillary GC column (L=30 m×I.D.=0.25 mm×df=0.25 μm).

Electrolysis conditions and results are summarized in Table 12 below:

TABLE 12

| Anolyte solution | 1M KOH |
| --- | --- |
| Catholyte solution | 0.45M KHCO$_3$ + 0.5M KCl |
| Anolyte flow rate | 8 mL/min |
| Catholyte flow rate | 8 mL/min |
| CO$_2$ gas flow rate | 10 sccm |
| Applied cell potential | −3.5 V |
| Current in 5 cm$^2$ cell | 60 mA/cm$^2$ |
| Final formic acid concentration in catholyte after 5 hours | 3.97% |
| Final formic acid concentration in anolyte after 5 hours | 0.28% |

Specific Example 16

The objective of this example is to show that a membrane made from (2-hydroxyethyl)imidazolium-poly(4-vinylbenzylchloride-co-styrene) chloride (PSIMOH-Cl) polymer solution is a helper membrane.

PSIMOH-Cl solution (in anhydrous dimethylformamide) was prepared by a two-step reaction process as shown in the following figure. 1) poly(4-VBC-co-St) synthesis from the reaction of styrene (St) with 4-vinylbenzyl chloride (4-VBC) in chlorobenzene under nitrogen gas (S.J. Smith, Urbana, Ill.) protection with 2,2'-Azobis(2-methylpropionitrile) (AIBN) as initiator; 2) poly(4-VBC-co-St) reacts with 1-(2-hydroxyethyl)imidazole at 50° C. for more than 20 hours to obtained PSMIMOH-Cl polymer solution.

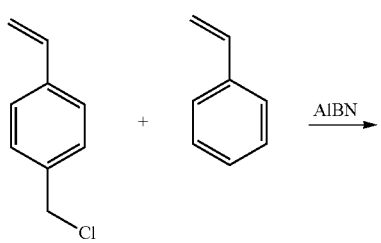

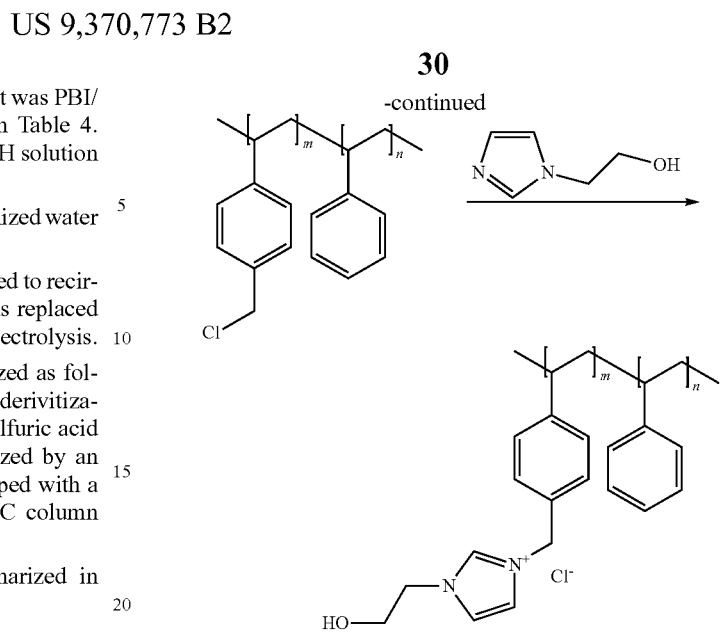

Synthesis of poly(4-vinylbenzyl chloride-co-styrene): A solution of inhibitor free styrene (Sigma-Aldrich, Milwaukee, Wis.) (19.53 g, 0.19 mol) and 4-vinylbenzyl chloride (Sigma-Aldrich, Milwaukee, Wis.) (16.16 g, 0.11 mol) in chlorobenzene (Sigma-Aldrich, Milwaukee, Wis.) (45 ml) was heated at 60-68° C. in an oil bath for 17.83 h under nitrogen gas with AIBN (Sigma-Aldrich, Milwaukee, Wis.) (0.36 g, 1.02 wt % based on the total monomers weight) as initiator. The copolymer was precipitated in CH$_3$OH/THF and dried under vacuum. VBC content in the copolymer was 45.28 wt %.

Synthesis of (2-hydroxyethyl)imidazolium-poly(4-VBC-co-St) chloride [PSIMOH-Cl]: 1-(2-hydroxyethyl)imidazole (Sigma-Aldrich, Milwaukee, Wis.) (0.7667 g, 6.84 mmol) was added to the solution of the poly(4-VBC-co-St) (1.9657 g) in anhydrous N,N-Dimethylformamide (DMF) (Sigma-Aldrich, Milwaukee, Wis.) (15 mL). The mixture was stirred at room temperature for 0.5-1 hour, and then heated at 50-54° C. for 22.25 hours.

Membrane preparation: (1) The PSIMOH-Cl polymer solution prepared above was cast onto a flat glass (13.5 cm×13.5 cm) with a 0.1 to 1 ml pipette. (2) The glass plate with membranes was put in an oven (MTI Corporation, Richmond, Calif.), the membranes were then dried at 80° C. for 7 hours and then 120° C. for another 2 hours under the protection of nitrogen.

(3) After oven temperature cooled down to room temperature, the membranes were taken out and soaked in a 1 M KOH (Fisher Scientific, Fair Lawn, N.J.) bath. Membranes were peeled off from the substrates and soaked in 1 M KOH solution for at least 24 hours for complete anion exchange (Cl$^-$→OH$^-$) before testing.

The resultant membrane 18 was tested and determined to meet the classification as a Helper Membrane according to the test set forth in the Summary of the Invention section of the present application. The testing results are listed in Table 13 below.

| Membrane # | 18 |
| --- | --- |
| Functional group in blend membrane (wt %) | 45.3 |
| Cell potential (V) | 3.0 |

-continued

| Membrane # | 18 |
|---|---|
| Current (mA/cm$^2$) | 118 |
| CO selectivity (%) | 96.8 |

This result satisfies the criterion for a Helper Membrane.

It is useful to compare the results here to results from the prior literature. Membranes containing vinylbenzyl-imidazolium but no styrene have been previously reported by Lin et al. (Chem. Mater. 2013, 25, 1858-1867), Tang et al. (Journal of Polymer Science: Part A: Polymer Chemistry, Vol. 43, 5477-5489 (2005)), as also reviewed by Varcoe et al., Energy Environ. Sci., 2014, 7, 3135, and in U.S. Pat. Nos. 8,449,652 and 8,552,130, as well as U.S. Pat. App. Pub. No. US2009/0266230. However, when the polymers with no styrene in specific example 16 were tested, it was found that the polymers dissolved in water, so no suitable membrane could be obtained.

Mikaye U.S. Pat. No. 4,430,445 describes the use of vinylbenzyl-imidazolium as a cross linking agent for styrene, but does not disclose styrene formulations with 10%-90% by weight of vinylbenzyl-imidazolium.

Bara et al., Pat. App. Pub. No. US2012/0186446 describes other formulations that are permeable to $CO_2$. The formulations are unsuitable for use in a $CO_2$ electrolyzer.

Zhang et al. (J. Mater. Chem., Vol. 21, 2011, p. 12744) and Said et al. (Chemistry and Materials Research, Vol. 6, No. 2, 2014, p. 19) report other polymers containing imidazolium groups but no vinylbenzyl chloride or styrene. Those polymers have much lower ion conductivities and are not suitable for use in converting $CO_2$ to useful reaction products.

Vinylbenzyl imidazolium polymers are reported in a 2012 Ph.D. thesis entitled "Synthesis and Applications of Imidazolium Ionic Liquid and Their Polymer Derivatives" by Woon Su Oh of Missouri University of Science and Technology (available from University Microfilms International (UMI), Publication No. 3530383). Oh's polymers have lower imidazonium content than in the polymers disclosed here.

While particular elements, embodiments and applications of the present invention have been shown and described, it will be understood that the invention is not limited thereto since modifications can be made by those skilled in the art without departing from the scope of the present disclosure, particularly in light of the foregoing teachings.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

What is claimed is:

1. An anion-conducting polymeric membrane comprising a polymer blend or mixture of a copolymer consisting essentially of styrene and vinylbenzyl-$R_s$ with at least one polymeric constituent selected from the group consisting of:
    (a) a linear or substituted non-aromatic polyolefin;
    (b) a polymer comprising cyclic amine groups;
    (c) a polymer, excluding polystyrene, comprising at least one of a phenylene group and a phenyl group;
    (d) a polyamide; and
    (e) the reaction product of styrene and vinylbenzyl-$R_s$ monomers with a crosslinking monomer having two carbon-carbon double bonds,
wherein $R_s$ is an imidazolium salt group and the copolymer contains 10%-90% by weight of vinylbenzyl-$R_s$ based upon the total weight of the copolymer, wherein the total weight of said at least one polymeric constituent in the membrane is less than the weight of the copolymer in the membrane, and wherein said polymeric membrane enables a carbon monoxide selectivity of at least 50%.

2. The polymeric membrane of claim 1, wherein said membrane has a thickness of 10-300 micrometers.

3. The polymeric membrane of claim 2, wherein said membrane is a Helper Membrane identifiable by applying a test comprising:
    (1) preparing a cathode comprising 6 mg/cm$^2$ of silver nanoparticles on a carbon fiber paper gas diffusion layer;
    (2) preparing an anode comprising 3 mg/cm$^2$ of $RuO_2$ on a carbon fiber paper gas diffusion paper;
    (3) preparing a polymeric membrane test material;
    (4) interposing the membrane test material between the anode and the cathode, the side of the cathode having the silver nanoparticles disposed thereon facing one side of the membrane and the side of the anode having $RuO_2$ disposed thereon facing the other side of the membrane, thereby forming a membrane electrode assembly;
    (5) mounting the membrane electrode assembly in a fuel cell hardware assembly;
    (6) directing a stream of $CO_2$ humidified at 50° C. into the cathode reactant flow channels while the fuel cell hardware assembly is at room temperature and atmospheric pressure, with the anode reactant flow channels left open to the atmosphere at room temperature and pressure;
    (7) applying a cell potential of 3.0 V via an electrical connection between the anode and the cathode;
    (8) measuring the current across the cell and the concentration of CO and $H_2$ at the exit of the cathode flow channel;
    (9) calculating the CO selectivity as follows:

$$\text{Selectivity} = \frac{(CO \text{ production rate})}{(CO \text{ production rate} + H_2 \text{ production rate})};$$

and
    (10) identifying the membrane as a Helper Membrane if the average current density at the membrane is at least 20 mA/cm$^2$, where the cm$^2$ is measured as the area of the cathode gas diffusion layer that is covered by catalyst particles, and CO selectivity is at least 50% at a cell potential of 3.0 V.

4. The polymeric membrane of claim 1, wherein said imidazolium is an alkylimidazolium.

5. The polymeric membrane of claim 1, wherein said imidazolium is a methylimidazolium.

6. The polymeric membrane of claim 1, wherein:
    said polyolefin is polyethylene;
    said polymer comprising cyclic amine groups is polybenzimidazole;
    said polymer comprising at least one of a phenylene group and a phenyl group is polyphenylene oxide, and
    said constituent having two carbon-carbon double bonds is at least one of divinyl benzene and butadiene.

7. The polymeric membrane of claim 1, wherein the copolymer contains 35%-90% by weight of vinylbenzyl-$R_s$.

8. The polymeric membrane of claim 7, wherein the copolymer contains 40%-90% by weight of vinylbenzyl-$R_s$.

9. The polymeric membrane of claim 8, wherein the copolymer contains 50%-80% by weight of vinylbenzyl-$R_s$.

10. The polymeric membrane of claim 1, wherein said copolymer has a molecular weight between 1,000 and 10,000,000 atomic units (A.U.).

11. The polymeric membrane of claim 10, wherein said copolymer has a molecular weight between 10,000 and 1,000,000 A.U.

12. The polymeric membrane of claim 11, wherein said copolymer has a molecular weight between 25,000 and 250,000 A.U.

13. In an electrochemical cell for electrochemically reducing carbon dioxide, the electrochemical cell comprising an anode, a cathode, an ion-conducting polymeric membrane interposed therebetween, a reactant stream comprising carbon dioxide in contact with said cathode, and a source of electrical power for directing electrical current from said cathode to said anode, whereby a reaction product comprising carbon monoxide is produced at said cathode, the improvement comprising:

said polymeric membrane comprising a polymer blend or mixture of a copolymer consisting essentially of styrene and vinylbenzyl-$R_s$ the copolymer forming a polymer blend or mixture with at least one polymeric constituent selected from the group consisting of:
(a) a linear or substituted non-aromatic polyolefin;
(b) a polymer comprising cyclic amine groups;
(c) a polymer, excluding polystyrene, comprising at least one of a phenylene group and a phenyl group;
(d) a polyamide; and
(e) the reaction product of styrene and vinylbenzyl-$R_s$ monomers with a constituent crosslinking monomer having two carbon-carbon double bonds,
wherein $R_s$ is an imidazolium salt group and the copolymer contains 10%-90% by weight of vinylbenzyl-$R_s$ based upon the total weight of the copolymer, wherein the total weight of said at least one polymeric constituent in the membrane is less than the weight of the copolymer in the membrane, and wherein said polymeric membrane enables a carbon monoxide selectivity of at least 50%.

14. The improved electrochemical cell of claim 13, wherein said imidazolium is an alkylimidazolium.

15. The improved electrochemical cell of claim 13, wherein said imidazolium is a methylimidazolium.

16. The improved electrochemical cell of claim 13, wherein:
said polyolefin is polyethylene;
said polymer comprising cyclic amine groups is polybenzimidazole;
said polymer comprising at least one of a phenylene group and a phenyl group is polyphenylene oxide, and
said constituent having two carbon-carbon double bonds is at least one of divinyl benzene and butadiene.

17. The improved electrochemical cell of claim 13, wherein said at least one polymeric constituent is present in an amount no greater than 20% of the sum of the weights of the copolymer and the at least one polymeric constituent.

* * * * *